(12) United States Patent
Yabu

(10) Patent No.: US 9,906,844 B2
(45) Date of Patent: Feb. 27, 2018

(54) VIDEO RECEPTION DEVICE, VIDEO RECOGNITION METHOD AND ADDITIONAL INFORMATION DISPLAY SYSTEM

(71) Applicant: Panasonic Intellectual Property Management Co., Ltd., Osaka (JP)

(72) Inventor: Hiroshi Yabu, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/888,449

(22) PCT Filed: Jul. 16, 2014

(86) PCT No.: PCT/JP2014/003762
§ 371 (c)(1),
(2) Date: Nov. 2, 2015

(87) PCT Pub. No.: WO2015/145493
PCT Pub. Date: Oct. 1, 2015

(65) Prior Publication Data
US 2016/0088365 A1 Mar. 24, 2016

(30) Foreign Application Priority Data
Mar. 26, 2014 (JP) ................. 2014-063498

(51) Int. Cl.
*H04N 21/81* (2011.01)
*H04N 21/234* (2011.01)
(Continued)

(52) U.S. Cl.
CPC ......... *H04N 21/8133* (2013.01); *G06F 13/00* (2013.01); *G06F 17/30* (2013.01);
(Continued)

(58) Field of Classification Search
CPC ......... H04N 21/8133; H04N 21/23424; H04N 21/4316; H04N 21/6582; H04N 21/84;
(Continued)

(56) References Cited

U.S. PATENT DOCUMENTS 7,712,123 B2  5/2010  Miyaoku et al.
8,199,221 B2  6/2012  Yoshizumi
(Continued)

FOREIGN PATENT DOCUMENTS

EP  1286541 A1  2/2003
EP  1954041 A1  2/2003
(Continued)

OTHER PUBLICATIONS

International Search Report of PCT application No. PCT/JP2014/003762 dated Oct. 21, 2014.
(Continued)

*Primary Examiner* — Pinkal R Chokshi
(74) *Attorney, Agent, or Firm* — McDermott Will & Emery LLP

(57) ABSTRACT

Video recognition processing regarding a video signal input from an outside is performed. Hence, video reception device configured to transmit/receive data through communication network includes video recognition unit. The video recognition unit is configured to perform at least one of: online matching processing for generating second content recognition information from a partial video extracted by video extraction unit, transmitting the second content recognition information to video recognition device so as to request video recognition device to perform video recognition processing; and local matching processing for collating the second content recognition information with first content recognition information included in a local database stored in storage unit.

5 Claims, 20 Drawing Sheets

(51) Int. Cl.
| | |
|---|---|
| G06F 13/00 | (2006.01) |
| G06F 17/30 | (2006.01) |
| H04N 21/237 | (2011.01) |
| H04N 21/437 | (2011.01) |
| H04N 21/44 | (2011.01) |
| H04N 21/462 | (2011.01) |
| G06K 9/00 | (2006.01) |
| H04N 5/265 | (2006.01) |
| H04N 21/431 | (2011.01) |
| H04N 21/258 | (2011.01) |
| H04N 21/658 | (2011.01) |
| H04N 21/84 | (2011.01) |

(52) U.S. Cl.
CPC ..... *G06F 17/3079* (2013.01); *G06K 9/00744* (2013.01); *G06K 9/00758* (2013.01); *H04N 5/265* (2013.01); *H04N 21/237* (2013.01); *H04N 21/23418* (2013.01); *H04N 21/23424* (2013.01); *H04N 21/25841* (2013.01); *H04N 21/437* (2013.01); *H04N 21/4316* (2013.01); *H04N 21/44008* (2013.01); *H04N 21/4622* (2013.01); *H04N 21/6582* (2013.01); *H04N 21/84* (2013.01)

(58) Field of Classification Search
CPC ............. H04N 21/23; H04N 21/437; H04N 21/23418; H04N 21/44008; H04N 21/4622; G06F 17/3079; G06K 9/00744; G06K 9/00758
See application file for complete search history.

(56) References Cited

U.S. PATENT DOCUMENTS

| | | | |
|---|---|---|---|
| 8,254,720 B2 | 8/2012 | Matsuzaki | |
| 8,421,921 B1 | 4/2013 | Woodall | |
| 8,582,952 B2 | 11/2013 | Circlaeys et al. | |
| 9,148,610 B2 | 9/2015 | Yabu | |
| 9,456,237 B2* | 9/2016 | Oztaskent | H04N 21/2665 |
| 2002/0001453 A1 | 1/2002 | Mizumura et al. | |
| 2002/0097339 A1 | 7/2002 | Kwon | |
| 2002/0126990 A1 | 9/2002 | Rasmussen et al. | |
| 2002/0143902 A1 | 10/2002 | Chung et al. | |
| 2003/0051252 A1* | 3/2003 | Miyaoku | H04N 7/17318 725/109 |
| 2003/0084462 A1 | 5/2003 | Kubota et al. | |
| 2003/0149983 A1 | 8/2003 | Markel | |
| 2004/0165865 A1 | 8/2004 | Seo et al. | |
| 2005/0071425 A1 | 3/2005 | Chung et al. | |
| 2005/0172312 A1 | 8/2005 | Lienhart et al. | |
| 2006/0187358 A1 | 8/2006 | Lienhart et al. | |
| 2006/0200842 A1 | 9/2006 | Chapman et al. | |
| 2007/0157242 A1* | 7/2007 | Cordray | H04H 60/33 725/46 |
| 2007/0233285 A1 | 10/2007 | Yamamoto | |
| 2007/0261079 A1 | 11/2007 | Pack et al. | |
| 2008/0181515 A1 | 7/2008 | Kondo | |
| 2008/0310731 A1 | 12/2008 | Stojancic et al. | |
| 2009/0006375 A1 | 1/2009 | Lax et al. | |
| 2009/0034937 A1 | 2/2009 | Kusunoki et al. | |
| 2009/0177758 A1 | 6/2009 | Banger et al. | |
| 2009/0244372 A1 | 10/2009 | Petronelli et al. | |
| 2009/0279738 A1 | 11/2009 | Sasaki | |
| 2010/0067873 A1 | 3/2010 | Sasaki et al. | |
| 2010/0259684 A1 | 10/2010 | Kambe | |
| 2010/0318515 A1 | 12/2010 | Ramanathan et al. | |
| 2011/0078202 A1 | 3/2011 | Kamibeppu | |
| 2011/0135283 A1 | 6/2011 | Poniatowki et al. | |
| 2011/0137976 A1 | 6/2011 | Poniatowski et al. | |
| 2011/0181693 A1 | 7/2011 | Lee et al. | |
| 2011/0243474 A1 | 10/2011 | Ito | |
| 2011/0246202 A1 | 10/2011 | McMillan et al. | |
| 2012/0020568 A1 | 1/2012 | Kogane | |
| 2012/0075421 A1 | 3/2012 | Tsukagoshi | |
| 2012/0092248 A1 | 4/2012 | Prabhala | |
| 2012/0128241 A1 | 5/2012 | Jung | |
| 2012/0320091 A1 | 12/2012 | Rajaraman et al. | |
| 2012/0321125 A1 | 12/2012 | Choi et al. | |
| 2013/0042289 A1 | 2/2013 | Park | |
| 2013/0047178 A1 | 2/2013 | Moon et al. | |
| 2013/0054645 A1 | 2/2013 | Bhagavathy et al. | |
| 2013/0094590 A1 | 4/2013 | Laksono et al. | |
| 2013/0106999 A1 | 5/2013 | Newton et al. | |
| 2013/0111514 A1 | 5/2013 | Slavin et al. | |
| 2013/0129219 A1 | 5/2013 | Takenouchi et al. | |
| 2013/0145395 A1 | 6/2013 | Jeong et al. | |
| 2013/0167189 A1 | 6/2013 | Lucas | |
| 2013/0198773 A1 | 8/2013 | Jentz et al. | |
| 2013/0202150 A1 | 8/2013 | Sinha et al. | |
| 2013/0205321 A1 | 8/2013 | Sinha et al. | |
| 2013/0230292 A1* | 9/2013 | Pierce | H04N 5/445 386/200 |
| 2013/0246457 A1 | 9/2013 | Stojancic et al. | |
| 2013/0247117 A1 | 9/2013 | Yamada et al. | |
| 2013/0254802 A1 | 9/2013 | Lax et al. | |
| 2013/0308818 A1 | 11/2013 | McIntosh et al. | |
| 2014/0007155 A1 | 1/2014 | Vemparala et al. | |
| 2014/0082655 A1 | 3/2014 | Moon | |
| 2014/0123204 A1 | 5/2014 | Moon et al. | |
| 2014/0229485 A1 | 8/2014 | Icho et al. | |
| 2014/0230002 A1 | 8/2014 | Kitazato | |
| 2015/0020094 A1 | 1/2015 | Moon et al. | |
| 2015/0026718 A1* | 1/2015 | Seyller | H04N 21/4316 725/34 |

FOREIGN PATENT DOCUMENTS

| | | |
|---|---|---|
| EP | 2 244 208 A2 | 10/2010 |
| EP | 2337345 A1 | 6/2011 |
| EP | 2760200 A1 | 7/2014 |
| EP | 2763427 A1 | 8/2014 |
| JP | H04-245552 A | 9/1992 |
| JP | H09-185720 A | 7/1997 |
| JP | H10-126721 A | 5/1998 |
| JP | 10-214258 | 8/1998 |
| JP | 2000-287189 | 10/2000 |
| JP | 2000-293626 A | 10/2000 |
| JP | 2002-175311 A | 6/2002 |
| JP | 2002-209204 | 7/2002 |
| JP | 2002-232372 A | 8/2002 |
| JP | 2002-334010 A | 11/2002 |
| JP | 2004-007323 | 1/2004 |
| JP | 2004-104368 A | 4/2004 |
| JP | 2004-303259 A | 10/2004 |
| JP | 2004-341940 A | 12/2004 |
| JP | 2005-167452 A | 6/2005 |
| JP | 2005-167894 A | 6/2005 |
| JP | 2005-347806 | 12/2005 |
| JP | 2006-030244 A | 2/2006 |
| JP | 2006-303936 A | 11/2006 |
| JP | 2007-049515 A | 2/2007 |
| JP | 2007-134948 A | 5/2007 |
| JP | 2008-040622 A | 2/2008 |
| JP | 2008-042259 A | 2/2008 |
| JP | 2008-116792 A | 5/2008 |
| JP | 2008-176396 A | 7/2008 |
| JP | 2008-187324 A | 8/2008 |
| JP | 2009-088777 A | 4/2009 |
| JP | 2010-164901 A | 7/2010 |
| JP | 2010-271987 A | 12/2010 |
| JP | 2011-034323 | 2/2011 |
| JP | 2011-059504 A | 3/2011 |
| JP | 2011-234343 A | 11/2011 |
| JP | 2012-055013 A | 3/2012 |
| JP | 2012-231383 A | 11/2012 |
| JP | 2013-038773 A | 2/2013 |
| JP | 2013-070268 A | 4/2013 |
| JP | 2013-125191 A | 6/2013 |
| JP | 2013-164753 A | 8/2013 |
| WO | 2004/080073 A2 | 9/2004 |
| WO | 2007/039994 A1 | 4/2007 |

(56) References Cited

FOREIGN PATENT DOCUMENTS

| WO | 2009/011030 A1 | 1/2009 |
|---|---|---|
| WO | 2010/022000 A2 | 2/2010 |
| WO | 2013/042531 A1 | 3/2013 |
| WO | 2013/047948 A1 | 4/2013 |
| WO | 2013/103273 A1 | 7/2013 |
| WO | 2013/119082 A1 | 8/2013 |
| WO | 2014/006903 A1 | 1/2014 |

OTHER PUBLICATIONS

Non-Final Office Action issued in U.S. Appl. No. 14/787,721, dated Aug. 4, 2016.
Final Office Action issued in U.S. Appl. No. 14/787,721, dated Dec. 2, 2016.
Non-Final Office Action issued in U.S. Appl. No. 14/787,759, dated Dec. 29, 2016.
Non-Final Office Action issued in U.S. Appl. No. 14/888,444, dated Oct. 6, 2016.
Non-Final Office Action issued in U.S. Appl. No. 14/888,447, dated Sep. 6, 2016.
Final Office Action issued in U.S. Appl. No. 14/888,447, dated Jan. 10, 2017.
Non-Final Office Action issued in U.S. Appl. No. 14/888,445, dated Aug. 12, 2016.
Non-Final Office Action issued in U.S. Appl. No. 14/890,121, dated Sep. 14, 2016.
The Extended European Search Report dated Jul. 5, 2016 for the related European Patent Application No. 14829140.4.
The Extended European Search Report dated Jun. 14, 2016 for the related European Patent Application No. 14832570.7 (with English translation).
The Extended Search Report dated Jul. 8, 2016 for the related Europena Patent Application No. 14838764.0.
The Extended European Search Report dated Jul. 19, 2016, for the related European Patent Application No. 14838765.7.
International Search Report of PCT application No. PCT/JP2014/003526 dated Oct. 7, 2014 (with English translation).
International Search Report of PCT application No. PCT/JP2014/003546 dated Oct. 7, 2014 (with English translation).
International Search Report issued in International Patent Application No. PCT/JP2014/003548, dated Oct. 7, 2014 (with English translation).
International Search Report of International Patent Application No. PCT/JP2014/003761, dated Oct. 21, 2014 (with English translation).
International Search Report of International Patent Application No. PCT/JP2014/003547, dated Oct. 7, 2014 (with English translation).
International Search Report of International Patent Application No. PCT/JP2014/003760, dated Oct. 7, 2014 (with English translation).
International Search Report of International Patent Application No. PCT/JP2015/004112, dated Oct. 27, 2015 (with English translation).
International Search Report of International Patent Application No. PCT/JP2015/003527, dated Aug. 11, 2015 (with English translation).
International Search Report of International Patent Application No. PCT/JP2015/004187, dated Oct. 20, 2015 (with English translation).
Gonzales R et al: "Digital Image Processing, Matching by correlation", Dec. 31, 2002 (Dec. 31, 2002), Digital Image Processing, Prentice-Hall Upper Saddle River, New Jersey, pp. 701-704, XP002657364.
Template matching, Wikipedia, Mar. 11, 2013 (Mar. 11, 2013), XP002759268, Retrieved from the Internet: URL:https://en.wikipedia.org/w/index.php?title=Template_matching &oldid=543510371 [retrieved on-Jun. 28, 2016].
Final Office Action issued in U.S. Appl. No. 14/888,449, dated Mar. 6, 2017.
The Extended European Search Report dated Feb. 28, 2017 for the related European Patent Application No. 14841401.4.
The Extended European Search Report dated Mar. 3, 2017 for the related European Patent Application No. 14841377.6.
Final Office Action issued in U.S. Appl. No. 14/888,445, dated Jan. 30, 2017.
Final Office Action issued in U.S. Appl. No. 14/888,444, dated May 15, 2017.
Non-Final Office Action issued in U.S. Appl. No. 14/890,121, dated Mar. 13, 2017.
Non-Final Office Action issued in related U.S. Appl. No. 13/958,863, dated Aug. 14, 2014.
Final Office Action issued in related U.S. Appl. No. 13/958,863, dated Jan. 23, 2015.
Non-Final Office Action issued in U.S. Appl. No. 14/787,721, dated Jun. 7, 2017.
Notice of Allowance issued in U.S. Appl. No. 14/787,759, dated May 9, 2017.
Non-Final Office Action issued in U.S. Appl. No. 14/888,445, dated Jun. 9, 2017.
Notice of Allowance issued in U.S. Appl. No. 14/888,444, dated Oct. 2, 2017.
Non-Final Office Action issued U.S. Appl. No. 14/890,121, dated Sep. 6, 2017.
Notice of Allowance issued in U.S. Appl. No. 14/888,447, dated Jul. 3, 2017.
The Extended European Search Report dated May 29, 2017 for the related European Patent Application No. 15832982.1.
The Extended European Search Report dated May 11, 2017 for the related European Patent Application No. 15822221.6.
Notice of Allowance issued in U.S. Appl. No. 14/888,445, dated Nov. 20, 2017.
Notice of Allowance issued in U.S. Appl. No. 14/787,721, dated Dec. 18, 2017.
Non-Final Office Action issued in U.S. Appl. No. 15/302,460, dated Dec. 20, 2017.

\* cited by examiner

FIG. 13

| Time range | "Time interval" calculation | | | | "Custom degree" calculation | | | | | | | | "Viewing frequency" calculation | | | "First setting status" calculation | | Next viewing time range likelihood |
|---|---|---|---|---|---|---|---|---|---|---|---|---|---|---|---|---|---|---|
| | Predetermined period (h) | Time difference (h) | α | Time interval | β | Interval (week) between viewing histories | | | | | Average viewing interval | Viewing custom degree | First number of viewing times | γ | Viewing frequency | Presence of recording setting | δ | First setting status |
| | | | | | | Time difference between present time and previous time | Time difference between previous time and two times before | Time difference between two times before and three times before | Time difference between three times before and four times before | Time difference between four times before and five times before | | | | | | | | |
| Time range A | 168 | 24 | 4 | 28.00 | 3 | 1 | 1 | 1 | 1 | 1 | 1 | 3.00 | 5 | 3 | 15 | 0 | 5 | 46.00 |
| Time range B | 168 | 36 | 4 | 18.67 | 3 | 1 | 1 | 3 | 1 | 1 | 2 | 1.69 | 3 | 3 | 9 | 0 | 5 | 29.36 |
| Time range C | 168 | 68 | 4 | 9.88 | 3 | 1 | 1 | 1 | 1 | 1 | 1 | 3.00 | 3 | 3 | 9 | 0 | 5 | 21.88 |
| Time range D | 168 | 104 | 4 | 6.46 | 3 | 1 | 1 | 1 | 1 | 1 | 1 | 3.00 | 5 | 3 | 15 | 0 | 5 | 24.46 |

FIG. 16

| Channel | "Occupancy" calculation ||||| "Second setting status" calculation ||| Next viewing channel likelihood |
|---|---|---|---|---|---|---|---|---|
| | Viewing history retrieval range | Second number of viewing times | ε | | Occupancy | Presence of recording setting | ζ | Second setting status | |
| First Channel | 5 | 0 | 5 | 0.83 | 0 | 3 | 0 | 0.83 |
| Second Channel | 5 | 2 | 5 | 2.50 | 0 | 3 | 0 | 2.50 |
| Third Channel | 5 | 0 | 5 | 0.83 | 0 | 3 | 0 | 0.83 |
| Fourth Channel | 5 | 0 | 5 | 0.83 | 0 | 3 | 0 | 0.83 |
| Fifth Channel | 5 | 3 | 5 | 3.33 | 0 | 3 | 0 | 3.33 |

US 9,906,844 B2

VIDEO RECEPTION DEVICE, VIDEO RECOGNITION METHOD AND ADDITIONAL INFORMATION DISPLAY SYSTEM

TECHNICAL FIELD

The present disclosure relates to a video reception device that acquires additional information regarding a video signal, which is input from an outside, and superimposes the additional information onto the video signal.

BACKGROUND ART

Patent Literature 1 discloses a data processing system. In this system, a client device transmits video data through a network to a server device that is a video recognition device, and requests the server device to perform video recognition processing. The server device performs video recognition based on the received video data, and transmits a result of the video recognition to the client device through the network.

CITATION LIST

Patent Literature

PTL 1: Unexamined Japanese Patent Publication No. H10-214258

SUMMARY

The present disclosure provides a video reception device, a video recognition method and an additional information display system, which are effective for acquiring additional information related to a video signal input from an outside, and for superimposing the acquired additional information on the video signal.

The video reception device of the present disclosure is configured to be capable of performing transmission/reception of data through a communication network, and includes an input unit, a video extraction unit, a storage unit, a video recognition unit, and a control unit. The input unit is configured to receive a video signal output from a video transmission device installed on the outside. The video extraction unit is configured to extract a partial video for video recognition processing from the video signal. The storage unit is configured to store a local database generated based on information for generating the local database in a video recognition device connected to the communication network. The video recognition unit is configured to perform at least one of: online matching processing for generating second content recognition information from the partial video, transmitting the second content recognition information to the video recognition device so as to request the video recognition device to perform video recognition processing; and local matching processing for collating the second content recognition information with first content recognition information included in the local database stored in the storage unit. The control unit is configured to perform control of acquiring the local database from the video recognition device, and to perform control of acquiring additional information from an additional information distribution device connected to the communication network, the additional information being based on a result of the online matching processing or a result of the local matching processing.

A video recognition method of the present disclosure is a video recognition method in a video reception device configured to be capable of performing transmission/reception of data through a communication network, the video recognition method including: extracting a partial video for video recognition processing from a video signal input from an outside; acquiring a local database generated based on information for generating the local database in a video recognition device connected to the communication network, and storing the local database in a storage unit; generating second content recognition information from the partial video; performing at least one of: online matching processing for transmitting the second content recognition information to the video recognition device so as to request the video recognition device to perform video recognition processing; and local matching processing for collating the second content recognition information with first content recognition information included in the local database stored in the storage unit; and acquiring additional information from an additional information distribution device connected to the communication network, the additional information being based on a result of the online matching processing or a result of the local matching processing.

An additional information display system of the present disclosure includes a video reception device, a video recognition device and an additional information distribution device, the devices being configured to be capable of performing mutual transmission/reception of data through a communication network. The video reception device includes an input unit, a video extraction unit, a storage unit, a video recognition unit, and a control unit. The input unit is configured to receive a video signal output from a video transmission device installed on an outside. The video extraction unit is configured to extract a partial video for video recognition from the video signal. The storage unit is configured to store a local database generated based on information for generating the local database in a video recognition device. The video recognition unit is configured to perform at least one of; online matching processing for generating second content recognition information from the partial video, transmitting the second content recognition information to the video recognition device through a communication network so as to request the video recognition device to perform video recognition processing; and local matching processing for collating the second content recognition information with first content recognition information included in the local database stored in the storage unit. The control unit is configured to perform control of acquiring the local database from the video recognition device through the communication network, and to perform control of acquiring additional information from an additional information distribution device through the communication network, the additional information being based on a result of the online matching processing or a result of the local matching processing. The video recognition device is configured to generate the first content recognition information from the acquired video signal and store the generated first content recognition information, and to select first content recognition information, which is related to the information for generating the local database, from the generated first content recognition information, generate the local database and transmit the generated local database to the video reception device, and configured to collate the second content recognition information, which is received through the communication network, with the stored first content recognition information and perform the online matching processing. The additional information distribution device is configured to transmit additional information to the video reception device through the communication network, the additional information corresponding to a result of the online matching processing received through the communication network, or a result of the local matching processing.

BRIEF DESCRIPTION OF DRAWINGS

FIG. 13 is a diagram showing an example of next viewing time zone likelihoods calculated by a video recognition unit of the video reception device in the first exemplary embodiment.

FIG. 16 is a diagram showing an example of next viewing channel likelihoods calculated by the video recognition unit of the video reception device in the first exemplary embodiment.

DESCRIPTION OF EMBODIMENTS

Figure 1:
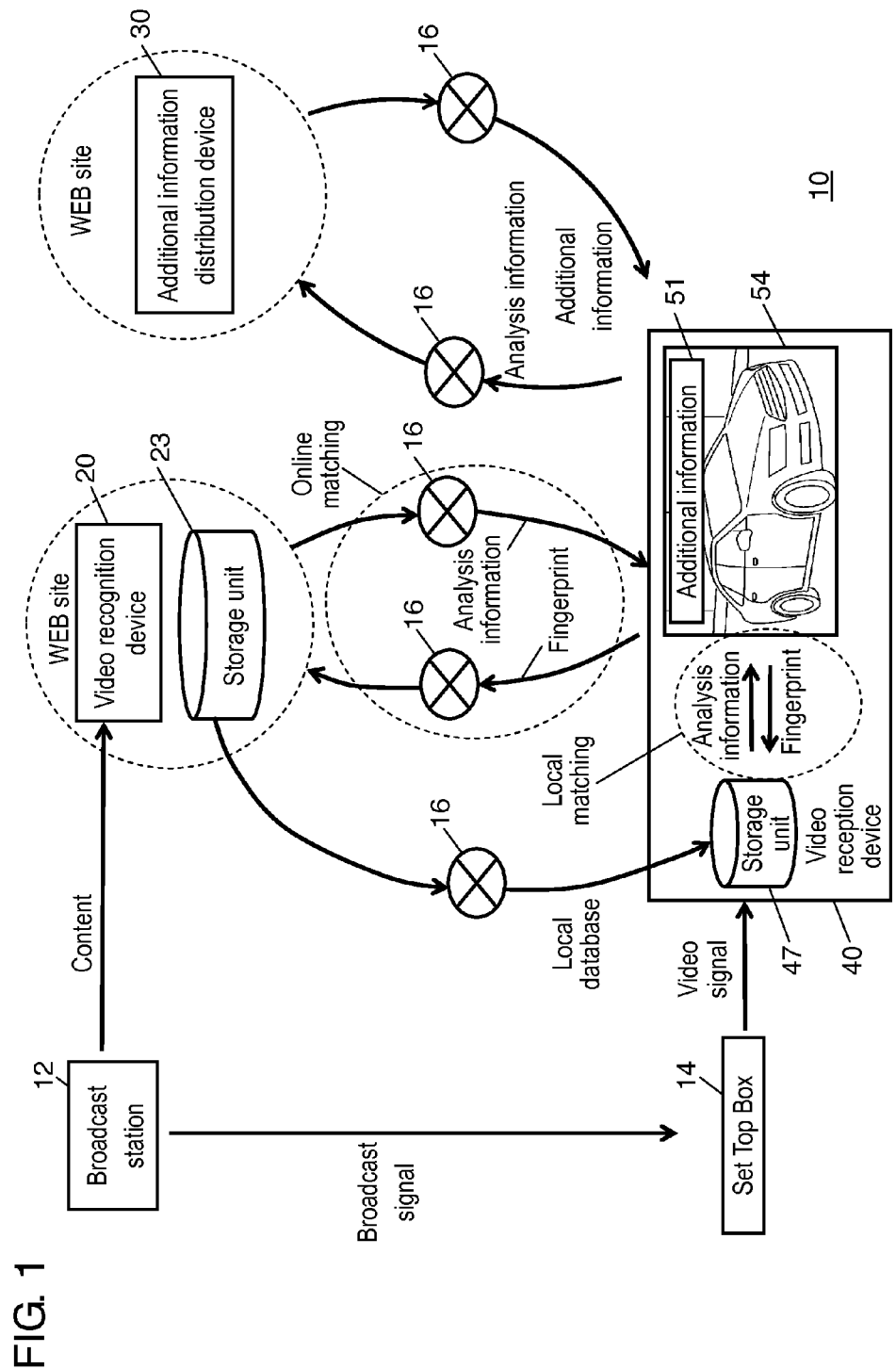
FIG. 1 is a diagram schematically showing an example a configuration of an additional information display system in a first exemplary embodiment.

A description is made below in detail of exemplary embodiments while referring to the drawings as appropriate. However, a description more in detail than necessary is omitted in some case. For example, a detailed description of a well-known item and a duplicate description of substantially the same configuration are omitted in some case. These omissions are made in order to avoid unnecessary redundancy of the following description and to facilitate the understanding of those skilled in the art.

Note that the accompanying drawings and the following description are provided in order to allow those skilled in the art to fully understand the present disclosure, and it is not intended to thereby limit the subject described in the scope of claims.

First Exemplary Embodiment

A description is made below of the first exemplary embodiment with reference to FIGS. 1 to 16.

[1-1. Configuration]

[1-1-1. Configuration Outline of Additional Information Display System]

FIG. 1 is a diagram schematically showing an example a configuration of additional information display system 10 in a first exemplary embodiment. Additional information display system 10 includes: broadcast station 12, STB (Set Top Box) 14 that is a video transmission device; video recognition device 20; additional information distribution device 30; and video reception device 40. Additional information display system 10 is a communication system configured to, by using a video recognition technology owned by video recognition device 20, specify to which content a video received by video reception device 40 belongs, acquire additional information, which is related to the content, from additional information distribution device 30, and display the acquired additional information on video reception device 40.

Video reception device 40, video recognition device 20 and additional information distribution device 30 are connected to one another through communication network 16.

Communication network 16 is composed in a wired manner, or in a wireless manner, or by mixing both of the manners. Communication network 16 is, for example, the Internet; however, may be an intranet, a commercial line, or other communication line, and may be a mixture of these.

Video reception device 40 and STB 14 are connected to each other through a communication interface. The communication interface is, for example, HDMI (registered trademark) (High-Definition Multimedia Interface): however, may be a video cable, or may be a wireless communication such as Wi-Fi (registered trademark), Bluetooth (registered trademark), and a wireless LAN (Local Area Network).

Broadcast station 12 is a transmission device configured to transmit (broadcast) a broadcast signal. Broadcast station 12 converts a television broadcast program which includes a main broadcast program and a commercial message (CM) into a video signal, and superimposes the video signal onto the broadcast signal, followed by broadcasting. The main broadcast program and the CM are switched to each other with an elapse of time. Hereinafter, the main broadcast program and the CM are referred to as "content". That is to say, broadcast station 12 broadcasts the content switched with the elapse of time. Note that the transmission device is never limited to broadcast station 12, and just needs to be one that transmits or broadcasts the content switched with the elapse of time.

STB 14 is a receiver (tuner) configured to receive the broadcast signal, which is broadcast by broadcast station 12, and to take out the video signal. For example, in a case where broadcast station 12 broadcasts a digital video signal, STB 14 may have a function of decoding the received video signal. STB 14 receives a channel selected from among a plurality of channels, which are broadcast by broadcast station 12, based on an instruction of a user, and outputs a video signal of the channel to video reception device 40 through a communication interface (for example, HDMI (registered trademark)). Note that the video transmission device is never limited to STB 14, and for example, may be a recording device that combines a recording function, a broadcast signal reception function, and a video signal output function, and the like.

Video recognition device 20 is a server device connected to communication network 16, and is a website for performing content specifying processing that is based on video recognition processing. The content specifying processing refers to processing for performing the video recognition processing based on second content recognition information transmitted from video reception device 40 through communication network 16, and for specifying the content, which is indicated by the second content recognition information, based on a result of the video recognition processing. For a purpose of use in these pieces of processing, video recognition device 20 acquires and analyzes the content (video signal) broadcast by broadcast station 12, generates first content recognition information and analysis information from the content, and stores these pieces of information in storage unit 23. This first content recognition information is, for example, a hash value of each image that composes a moving image. Hereinafter, this first content recognition information is also referred to as "server video recognition information". That is to say, video recognition device 20 operates so as to collate received second content recognition information with "server video recognition information" generated in advance by video recognition device 20 and stored in storage unit 23 (video recognition processing), to specify the content based on a result of such collation (content specifying processing), and to return analysis information, which is related to the specified content, to video reception device 40.

Video recognition device 20 receives an enormous number of items of content broadcast by broadcast station 12, analyzes these items of content, and stores results of such analyses in storage unit 23, and accordingly, an amount of information stored in storage unit 23 also becomes enormous. Hereinafter, an aggregate of the information (information for use in the content specifying processing) stored in storage unit 23 is referred to as an "online database". Video recognition device 20 also performs processing for selecting the predetermined first content recognition information (server video recognition information) and the analysis information from the online database with the enormous information amount, generating a "local database, and transmitting the generated local database to video reception device 40.

Details of the operations of video recognition device 20 will be described later.

Video reception device 40 is a video reception device configured to display a video, which is based on a video signal input from an outside, on displaying unit 54, and for example, is a television receiver. Video reception device 40 is connected to communication network 16, and can transmit/receive data to/from video recognition device 20 and additional information distribution device 30 through communication network 16.

Video reception device 40 in this exemplary embodiment is configured to be capable of performing the following things. Video reception device 40 performs the content specifying processing (content specifying processing based on video recognition processing) regarding the video signal, which is input from the video transmission device (for example, STB 14) through the communication interface, by using video recognition device 20. As mentioned above, the content specifying processing refers to processing for specifying the content expressed by the video signal concerned. Video reception device 40 receives the analysis information transmitted as a result of the content specifying processing from video recognition device 20, and based on the analysis information, acquires additional information (for example, advertisement information), which is related to the content concerned, from additional information distribution device 30, and then superimposes and displays the acquired additional information on the video signal concerned on displaying unit 54.

Specifically, video reception device 40 periodically extracts a partial video by periodically cutting out a part from the video signal input thereto, and transmits the second content recognition information generated from the partial video and a request for the content specifying processing (content specifying processing based on the video recognition processing) to video recognition device 20 through communication network 16. This second content recognition information is, for example, a hash value of each image that composes the partial video. Hereinafter, the second content recognition information generated by video reception device 40 is also referred to as "terminal video recognition information". Moreover, the request for the content specifying processing, which is transmitted from video reception device 40 to video recognition device 20, is also referred to as a "video recognition request". Then, video reception device 40 acquires the result (analysis information) of the content specifying processing for the second content recognition information from video recognition device 20 through communication network 16. In this exemplary embodiment, the content specifying processing (content specifying processing based on the video recognition processing), which video reception device 40 performs by using video recognition device 20, is referred to as "online matching processing".

Moreover, video reception device 40 receives the "local database", which is transmitted from video recognition device 20, and stores the received "local database" in storage unit 47. This local database includes the first content recognition information (server video recognition information) and the analysis information, which are generated by video recognition device 20. Then, separately from the above-mentioned local matching processing, video reception device 40 also performs operations of collating the terminal video recognition information with the local database stored in storage unit 47, thereby performing the content specifying processing, and reading out analysis information, which is based on a result of the content specifying processing, from storage unit 47. In this exemplary embodiment, the content specifying processing performed by using the local database stored in storage unit 47 is referred to as "local matching processing".

Then, video reception device 40 acquires additional information, which is related to the analysis information acquired as a result of the online matching processing or the local matching processing, through communication network 16 from additional information distribution device 30. Then, video reception device 40 superimposes and displays an image (illustrated as "additional information 51" in FIG. 1), which is based on the acquired additional information, on the video being displayed on displaying unit 54. Details of these will be described later.

Note that, in this exemplary embodiment, a description is made of a case where a fingerprint is the content recognition information (terminal video recognition information, server video recognition information). The content recognition information is information for recognizing the video, and the fingerprint is the hash value of each of images composing the partial video and the moving image. However, the content recognition information just needs to be information (data) usable for the video recognition processing, and is never limited to the fingerprint (hash value).

Additional information distribution device 30 is a server device connected to communication network 16, and is a website (advertisement distribution site) that holds and distributes advertisement information of a variety of commercial products. Upon receiving, through communication network 16, the result (analysis information which video reception device 40 has acquired as a result of the online matching processing from video recognition device 20, or analysis information which video reception device 40 has read out as a result of the local matching processing from storage unit 47) of the content specifying processing, which is transmitted from video reception device 40, additional information distribution device 30 transmits additional information, which is related to the analysis information, through communication network 16 to video reception device 40. For example, this additional information is advertisement information, which is related to the content specified by the content specifying processing.

Note that the additional information is never limited to the advertisement information, and for example, may be tourism information, history information, personal profile information, a URL (Uniform Resource Locator), public relations information, information regarding a broadcast program under broadcast, social information such as Twitter (registered trademark), and the like.

Figure 2:
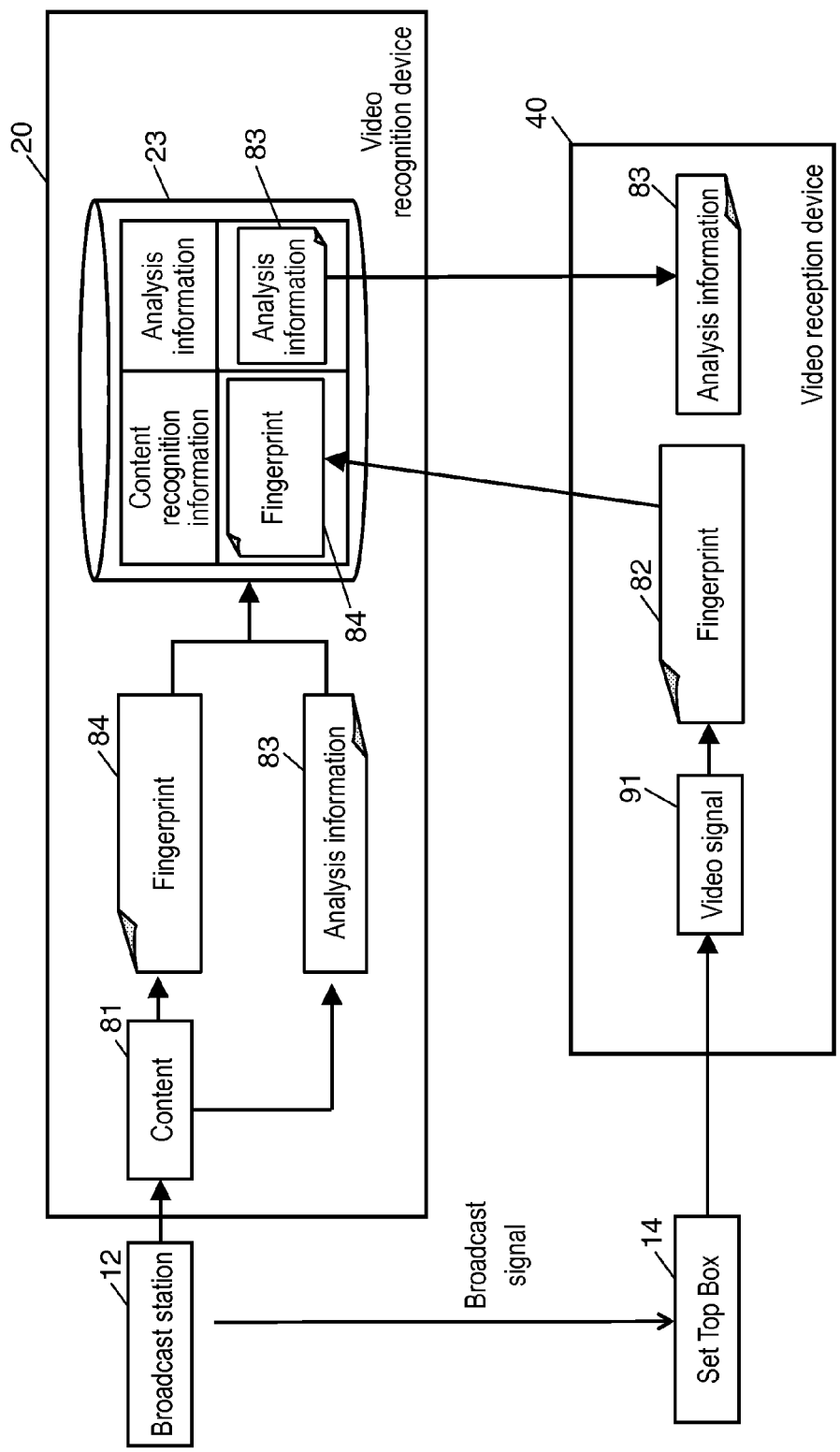
FIG. 2 is a schematic diagram schematically showing an example of operations of a video recognition device in the first exemplary embodiment.

Next, an example of the operations of video recognition device 20 is described with reference to FIG. 2. FIG. 2 is a schematic diagram schematically showing an example of the operations of video recognition device 20 in the first exemplary embodiment. Note that FIG. 2 schematically shows flows of signals and information, and does not show configurations of the circuit blocks.

Video recognition device 20 acquires substantially all items of content 81 broadcast from broadcast station 12. Then, video recognition device 20 analyses the acquired content, checks a time, volume, broadcast format, content, category, characters, time table and the like of the content, and creates analysis information 83. Moreover, video recognition device 20 generates fingerprint 84, which is the second content recognition information, from video signals of content 81 acquired from broadcast station 12. Video recognition device 20 may acquire the content by receiving broadcast signals broadcast from broadcast stations, or alternatively, may acquire the content by receiving the video signal transmitted from broadcast station 12 through a dedicated video line and the like. Moreover, for example, this analysis may be automatically performed, or may be performed manually by an operator. Analysis information 83 and fingerprint 84, which are results of this analysis, are stored in storage unit 23 of video recognition device 20 together with the information regarding content 81. Hence, an enormous amount of information is stored in storage unit 23.

Then, video recognition device 20 performs the online matching processing if video reception device 40 makes a request therefor. That is to say, upon receiving a video recognition request accompanied with fingerprint 82 (terminal video recognition information: second content recognition information generated from partial video of video signal 91 output from STB 14), which is transmitted from video reception device 40, through communication network 16, video recognition device 20 collates fingerprint 82 (performs video recognition processing) with fingerprint 84 (server video recognition information), which is the first content recognition information stored in storage unit 23, and specifies content corresponding to fingerprint 82. Note that, in this collation operation, for example, fingerprint 84 in which a degree of similarity to fingerprint 82 is a predetermined value (for example, 60%) or more may be defined as such a fingerprint corresponding to fingerprint 82. In this way, video recognition device 20 performs the content specifying processing for determining to what content the partial video as a creation source of fingerprint 82 transmitted from video reception device 40 belongs, and for specifying the content. Then, video recognition device 20 reads out an analysis result (analysis information 83) regarding the specified content from storage unit 23, and returns readout analysis information 83 as a result of the content specifying processing to video reception device 40 through communication network 16. Details of this online matching processing will be described later.

The video recognition processing (content specifying processing that is based on the video recognition processing) according to such a technique is also referred to "ACR (Automatic Content Recognition)".

Note that storage unit 23 of video recognition device 20 may be installed at a place different from that of a body of video recognition device 20 as long as being configured to be capable of transferring data with the body of video recognition device 20, for example, by passing the data through communication network 16, and so on.

[1-1-2. Configurations of Video Recognition Device and Video Reception Device]

Figure 3:
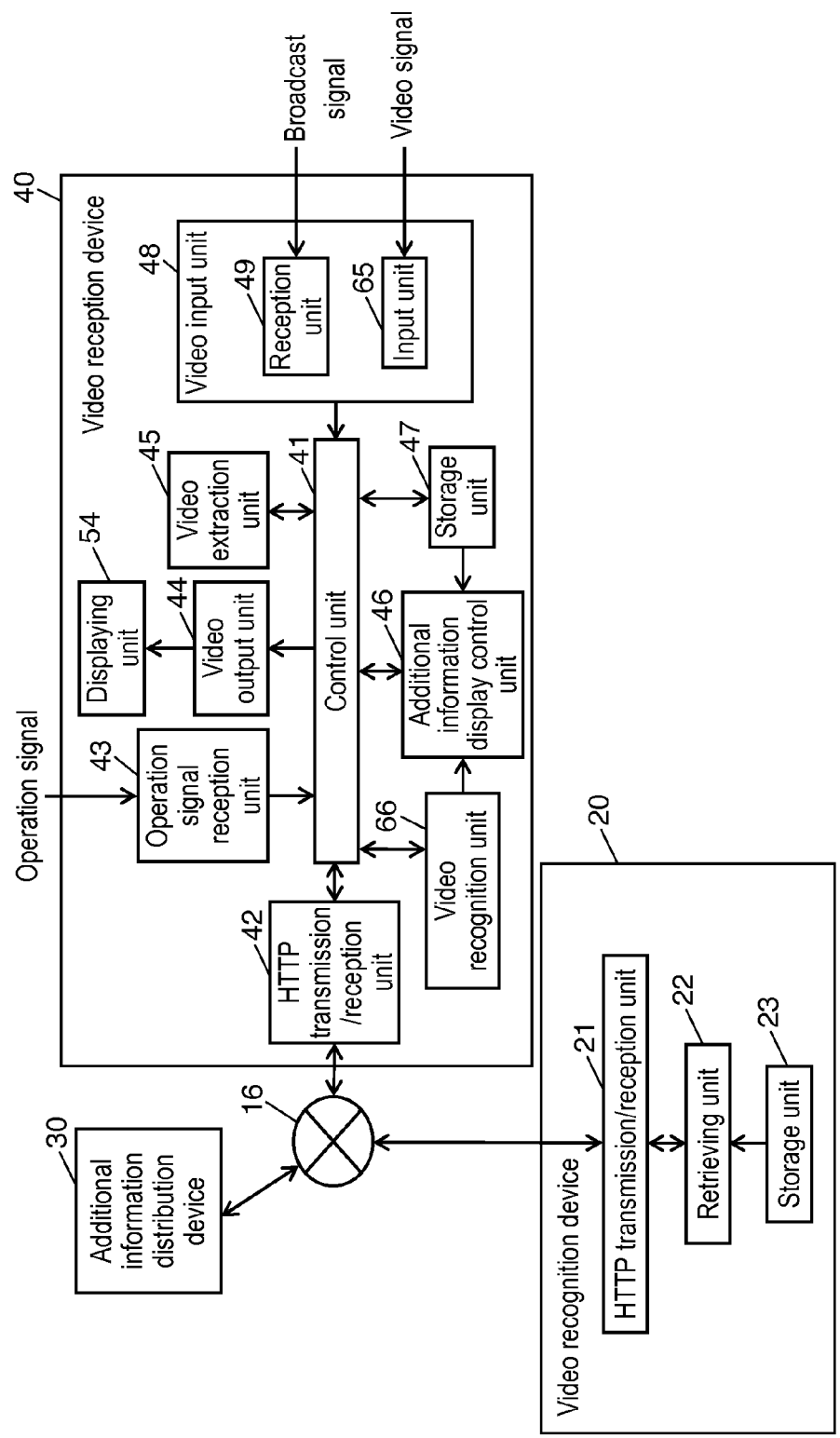
FIG. 3 is a block diagram schematically showing an example of configurations of the video recognition device and a video reception device in the first exemplary embodiment.

FIG. 3 is a block diagram schematically showing an example of configurations of video recognition device 20 and video reception device 40 in the first exemplary embodiment.

Note that, in FIG. 3, main circuit blocks, which are related to the operations shown in this exemplary embodiment, are shown, and functions and circuit blocks, which are related to other operations, are omitted. This is for the purpose of facilitating the operations described in this exemplary embodiment. Moreover, the respective circuit blocks shown in FIG. 3 may be composed of circuits independent of each other, or alternatively, may have configurations in which a program created so as to realize one or more of the circuit blocks shown in FIG. 3 is executed by a processor. Moreover, hereinafter, the first content recognition information and the second content recognition information are simply abbreviated as "fingerprints".

Video recognition device 20 is a server device including HTTP (Hypertext Transfer Protocol) transmission/reception unit 21, retrieving unit 22, and storage unit 23. Video recognition device 20 is used for the online matching processing of video reception device 40, and is configured to provide a service of the content specifying processing, which is based on the video recognition processing, to video reception device 40 through communication network 16.

HTTP transmission/reception unit 21 is an interface for communication, and for example, is a communication adapter adapted to the standard of Ethernet (registered trademark). HTTP transmission/reception unit 21 is composed so as to be capable of performing transmission/reception of data to/from video reception device 40 through communication network 16.

Storage unit 23 is a storage device composed, for example, of an HDD (Hard Disk Drive) or the like. Storage unit 23 is configured to store the fingerprint of the content, which is broadcast from broadcast station 12, and the analysis information of the analysis result for the content, in association with the content.

For example, for all channels (for example, 300 channels) broadcast from broadcast station 12, storage unit 23 stores the fingerprint and the analysis result (analysis information) in association with each other for each content (for example, the main broadcast program and the CM) with a slight delay (for example, 10 seconds) from the broadcast. This analysis result (analysis information) may include, for example, a title of the broadcast program, a title of the CM, a synopsis of the broadcast program, a synopsis of the CM, the characters, the place related to the video, the URL, and the like. Moreover, in storage unit 23, fingerprints and analysis information of a drama, a picture, a CM and the like, in which broadcast content is decided in advance, may be stored, or alternatively, fingerprints and analysis information regarding a broadcast program title, a logotype of an enterprise and a commercial product, character information and the like, which are known in advance to be displayed under broadcast, may be stored.

Retrieving unit 22 is configured to, upon receiving the video recognition request accompanied with the fingerprint (terminal video recognition information), which is transmitted from video reception device 40, through HTTP transmission/reception unit 21, to perform the content specifying processing that is based on the video recognition processing using the fingerprint, and to return a result (analysis information) thereof to video reception device 40 through HTTP transmission/reception unit 21.

Specifically, retrieving unit 22 receives the video recognition request accompanied with the fingerprint (terminal video recognition information), which is transmitted from video reception device 40, through communication network 16 and HTTP transmission/reception unit 21. Next, retrieving unit 22 collates the received fingerprint (terminal video recognition information) with the fingerprint (server video recognition information) stored in storage unit 23, and retrieves a fingerprint corresponding the received fingerprint (video recognition processing). Then, retrieving unit 22 defines content, which corresponds to the fingerprint specified by a result of the retrieval, as content corresponding to the received fingerprint (content specifying processing). In this way, retrieving unit 22 specifies the content corresponding to the received fingerprint. Then, retrieving unit 22 reads out an analysis result (analysis information), which is associated with the specified content, from storage unit 23, defines the readout analysis result (analysis information) as a result of the content specifying processing, and returns the result of the content specifying processing to video reception device 40 through HTTP transmission/reception unit 21 and communication network 16.

Video reception device 40 includes control unit 41, HTTP transmission/reception unit 42, operation signal reception unit 43, video output unit 44, displaying unit 54, video extraction unit 45, additional information display control unit 46, storage unit 47, video input unit 48 and video recognition unit 66. Video reception device 40 is configured to perform content specifying processing that is based on the video recognition processing using video recognition device 20 (online matching processing), and to acquire the analysis information as a result of the content specifying processing from video recognition device 20. Moreover, video reception device 40 is also configured to perform the content specifying processing that is based on the video recognition processing using the local database stored in storage unit 47 (local matching processing), and to read out the analysis information that is based on a result of the content specifying processing from storage unit 47. Furthermore, video reception device 40 is configured to acquire the additional information (for example, advertisement information), which is related to the analysis information, from additional information distribution device 30, to superimpose an image, which is based on the additional information (for example, advertisement information related to a video (content) of the received video signal), on the video concerned, and to display the superimposed image on displaying unit 54.

HTTP transmission/reception unit 42 is an interface for communication, and for example, is a communication adapter adapted to the standard of Ethernet (registered trademark). HTTP transmission/reception unit 42 is configured to be capable of performing transmission/reception of data to/from video recognition device 20 through communication network 16.

Operation signal reception unit 43 is configured to receive an operation signal (operation signal to video reception device 40) transmitted by an operation unit (not shown) such as a remote control device (hereinafter, abbreviated as a "remote controller") that has received a user's operation. Operation signal reception unit 43 may be configured to receive a signal, which is transmitted by a remote controller with a gyro sensor based on a physical variation generated in the remote controller.

Video input unit 48 is a reception circuit and a decoder, and includes: reception unit 49 configured to receive the broadcast signal transmitted by the broadcast station; and input unit 65 configured to receive the video signal output by the video transmission device (for example, STB 14). The video signal received by video input unit 48 includes content (main broadcast program, CM and the like) switched following elapse of a time.

Reception unit 49 is configured to receive the broadcast signal, which is transmitted by broadcast station 12, through an antenna (not shown) and the like.

Input unit 65 is an interface configured to receive the video signal output from the video transmission device installed on the outside. For example, input unit 65 is configured to be adapted to the standard of HDMI (registered trademark), and can receive the video signal transmitted from the video transmission device through HDMI (registered trademark). For example, this video transmission device is STB 14; however, may be a video recording/playback device and the like. Moreover, the input unit may be configured to receive a video signal received through a video cable, and a video signal transmitted by wireless communication.

Video output unit 44 has a function of controlling displaying unit 54, and is configured to control displaying unit 54 based on the video signal input from video input unit 48, and to display a video, which is based on the video signal, on displaying unit 54. Upon receiving the additional information from control unit 41, video output unit 44 superimposes the image, which is based on the additional information, on the video being displayed on displaying unit 54.

Displaying unit 54 is a display configured to display the video that is based on the video signal, and for example, is an LCD (Liquid Crystal Display). However, this exemplary embodiment is never limited to this configuration, and displaying unit 54 may be a PDP (Plasma Display Panel), an OLED (Organic Electro Luminescence Display) and the like.

Additional information display control unit 46 is configured to perform a display control for the additional information. Specifically, additional information display control unit 46 determines whether or not to display the additional information, which is acquired from additional information distribution device 30 based on the analysis information acquired as a result of the online matching processing or the local matching processing, on displaying unit 54 (whether or not to superimpose the additional information on the video signal), or whether or not to continuously display the additional information being displayed on displaying unit 54, and then outputs an instruction that is based on such a determination to control unit 41. Moreover, additional information display control unit 46 determines on which spot of the video being displayed on displaying unit 54 the image (or text string) based on the acquired additional information is to be superimposed, and then outputs an instruction that is based on such a determination to control unit 41.

Video extraction unit 45 is configured to extract the partial video from the video signal input from video input unit 48. Video extraction unit 45 is configured to extract from the video signal a partial video which is a part of the video signal by an amount of a predetermined time in a predetermined cycle. For example, if the predetermined cycle is three seconds and the predetermined time is three seconds, then video extraction unit 45 repeats an operation of extracting the three-second partial video from the video signal every three seconds. That is to say, video extraction unit 45 repeats an operation of extracting the three-second partial video from the video signal every three seconds continuously without any letup. Moreover, for example, if the predetermined cycle is 15 seconds and the predetermined time is three seconds, then video extraction unit 45 repeats an operation of extracting the three-second partial video from the video signal every 15 seconds. That is to say, video extraction unit 45 repeats an operation of extracting the three-second partial video from the video signal at an interval of 12 seconds. Note that the partial video extracted from the video signal is not limited to such extraction in units of seconds, and for example, the partial video may be extracted in units of a predetermined number of frames based on a video frame rate.

Video recognition unit 66 generates the fingerprint (terminal video recognition information) from the partial video extracted by video extraction unit 45. For example, this fingerprint is the hash value (fingerprint) of each image that composes the partial video. Video recognition unit 66 performs at least one of the local matching processing for performing the content specifying processing in video reception device 40 by using the fingerprint generated from the partial video, and the online matching processing for performing the content specifying processing by using video recognition device 20, and acquires the analysis information regarding the partial video.

Storage unit 47 is a storage device composed, for example, of a nonvolatile memory and the like. Storage unit 47 stores: broadcast program meta-information such as an electronic program guide (EPG) received by video input unit 48; the additional information and display control information of the additional information, which are acquired from additional information distribution device 30 through HTTP transmission/reception unit 42; the fingerprint (terminal video recognition information) generated from the partial video by video recognition unit 66; the local database including the fingerprint (server video recognition information and the analysis information, which are transmitted from video recognition device 20; and the like. The display control information for the additional information is information for controlling the display of the additional information, and for example, includes information indicating a display period of the additional information, and the like. Moreover, storage unit 47 also stores information regarding a viewing history of video reception device 40.

Control unit 41 is configured to control the respective circuit blocks which video reception device 40 includes. For example, control unit 41 is composed of: a nonvolatile memory such as a ROM that stores a program (application program or the like); a CPU that executes the program; a volatile memory such as a RAM that temporarily stores data, a parameter and the like when the CPU executes the program; and the like.

For example, the control performed by control unit 41 includes those as mentioned below. Control unit 41 controls video extraction unit 45 to extract the partial video from the video signal in a predetermined cycle. Moreover, control unit 41 generates (calculates) the fingerprint (terminal video recognition information) from the partial video, and controls video recognition unit 66 to perform the online matching processing or the local matching processing, which is based on the generated fingerprint. Then, at the time the online matching processing is performed, control unit 41 controls the respective circuit blocks to transmit the fingerprint (terminal video recognition information) to video recognition device 20 through HTTP transmission/reception unit 42 and communication network 16 together with the video recognition request, and to request video recognition device 20 to perform the content specifying processing (content specifying processing that is based on video recognition processing) for the fingerprint. Then, control unit 41 controls the respective circuit blocks to acquire a result (analysis information) of the content specifying processing for the fingerprint from video recognition device 20 through communication network 16 and HTTP transmission/reception unit 42, and to store the result in storage unit 47. Moreover, at the time the local matching processing is performed, control unit 41 controls the respective circuit blocks to perform the content specifying processing by collating the fingerprint (terminal video recognition information) with the local database stored in storage unit 47, and to read out the analysis information, which is based on a result of the content specifying processing, from storage unit 47. Then, control unit 41 controls the respective circuit blocks to acquire the additional information, which corresponds to the analysis information obtained as a result of the online matching processing or the local matching processing, from additional information distribution device 30 through communication network 16 and HTTP transmission/reception unit 42. Then, control unit 41 controls the respective circuit blocks to output the acquired additional information to video output unit 44 as well as to store the same in storage unit 47, and to superimpose and display the additional information on the video being displayed on displaying unit 54. At this time, if additional information display control unit 46 determines "not to display the additional information", then control unit 41 controls the respective circuit blocks not to display the additional information being displayed on displaying unit 54.

Note that, additional information display system 10 may be configured so that, when video reception device 40 requests video recognition device 20 to perform the online matching processing, video reception device 40 can create a signal (data) indicating such a request for the online matching processing, and can transmit the signal as a video recognition request to video recognition device 20; however, for example, such transmission of the signal (data) as described above may not be performed, but an arrangement may be made between video reception device 40 and video recognition device 20 so that the fact that video reception device 40 transmits the fingerprint to video recognition device 20 can result in that video reception device 40 requests video recognition device 20 to perform the online matching processing.

Figure 4:
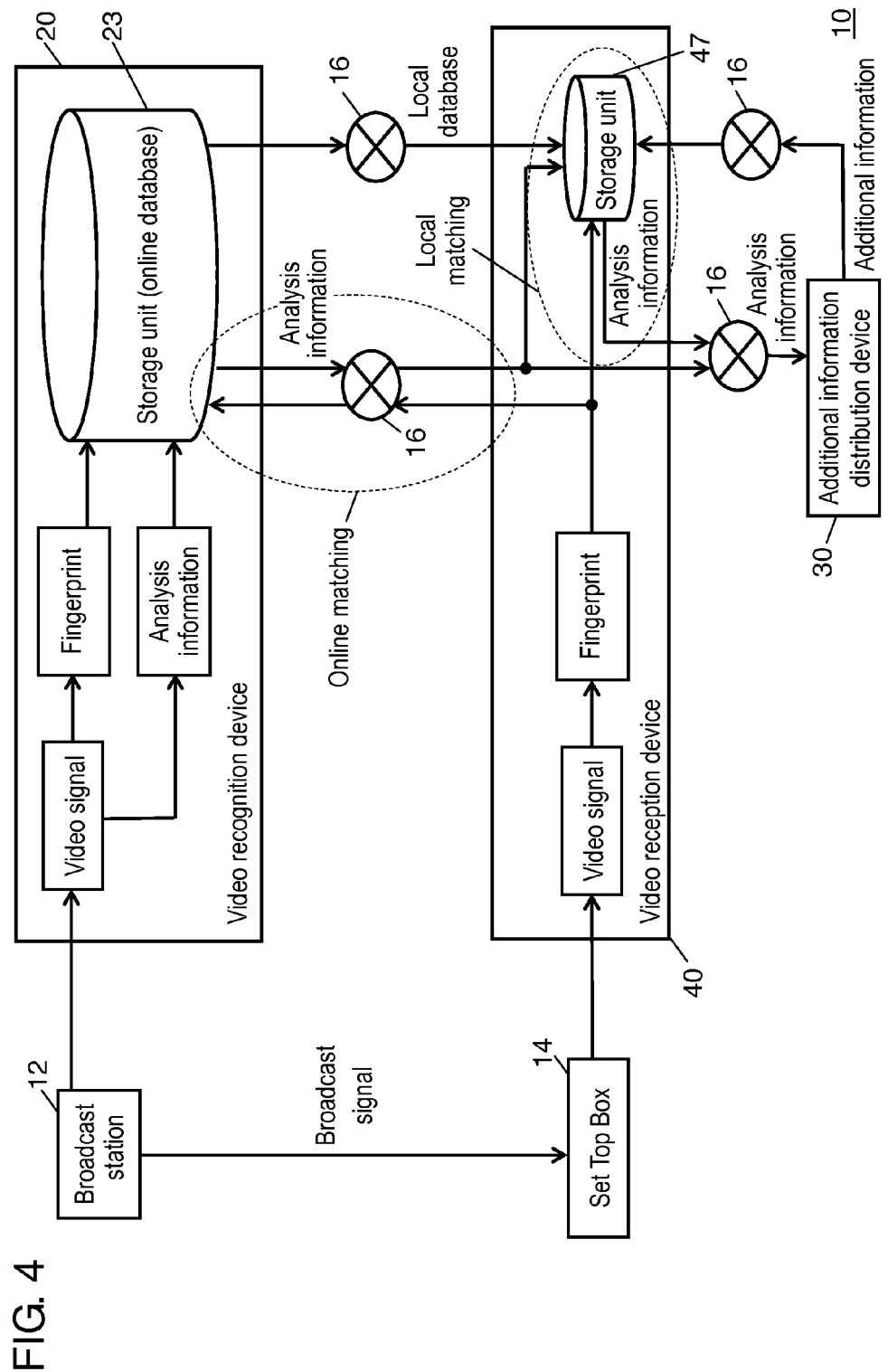
FIG. 4 is a schematic diagram showing outlines of online matching processing and local matching processing of the additional information display system in the first exemplary embodiment.

Next, a description is made of outlines of the online matching processing and the local matching processing. FIG. 4 is a schematic diagram showing the outlines of the online matching processing and local matching processing of additional information display system 10 in the first exemplary embodiment. Note that FIG. 4 schematically shows flows of signals and information, and does not show configurations of the circuit blocks.

As shown in FIG. 4, in the online matching processing, video reception device 40 and video recognition device 20 perform the content specifying processing (content specifying processing regarding the video signal input to video reception device 40 from video transmission device such as STB 14), which is based on the video recognition processing, in cooperation with each other.

As mentioned above, such a data amount of the online database stored in storage unit 23 of video recognition device 20 is enormous. Therefore, in the online matching processing, content specifying processing with high accuracy can be performed; however, it takes a time to collate the fingerprint (terminal video recognition information), which is transmitted from video reception device 40, and the fingerprint (server video recognition information) stored as the online database in storage unit 23, with each other.

For example, if a present viewing channel (channel selected in STB 14) is known from a result of the content specifying processing performed immediately before, and the like, then video recognition device 20 can narrow down a target range of the retrieval to the viewing angle, and accordingly, it is possible to end that collation in a relatively short time. However, if the present viewing channel is unknown at such a time immediately after a power supply to video reception device 40 is turned on or immediately after the channel is changed, then the target range of the retrieval is extended to all channels, and accordingly, it takes a relatively long time for video recognition device 20 to perform the collation.

Moreover, in the online matching processing, it also takes a time to transmit/receive data through communication network 16.

Meanwhile, the local database stored in storage unit 47 of video reception device 40 is generated based on the fingerprint (server video recognition information) selected from the online database by video recognition device 20, the analysis information, and the like, and accordingly, a data amount of the local database is smaller in comparison with that of the online database. That is to say, the local matching processing is content specifying processing performed by collating the fingerprint (terminal video recognition information), which is generated by video reception device 40, with the local database smaller in data amount than the online database. Moreover, in the local matching processing, it is not necessary to transmit/receive the data through communication network 16 in an event of performing the content specifying processing. Hence, such a time required for the local matching processing can be shortened in comparison with such a time required for the online matching processing.

Video reception device 40 selectively performs the local matching processing and the online matching processing, which are as described above, or performs both of them, and thereby becomes capable of performing the content specifying processing (content specifying processing that is based on the video recognition processing) regarding the video signal, which is input from video transmission device such as STB 14, with high accuracy while shortening the time.

Note that, desirably, the local database is updated as appropriate in order to perform the local matching processing with high accuracy. Such update of the local database will be described later.

[1-2. Operations]

A description is made of an example of the operations of additional information display system 10, which is configured as described above, with reference to FIG. 5 to FIG. 16.

As mentioned above, for example, upon receiving the video signal output from the video transmission device such as STB 14, video reception device 40 performs the content specifying processing, which is aimed for the video signal, by the online matching processing using video recognition device 20, or by the local matching processing using the local database. Then, video reception device 40 acquires additional information 51 (for example, advertisement information), which is related to the result of the content specifying processing, from additional information distribution device 30, superimposes acquired additional information 51 on the video signal, and displays additional information 51 on displaying unit 54. Moreover, video reception device 40 displays or does not display acquired additional information 51 (for example, advertisement information) in response to the display control information for the additional information, which is acquired together with additional information 51.

A description is made below of an outline of this additional information display processing.

[1-2-1. Operations of Additional Information Display Processing]

Figure 5:
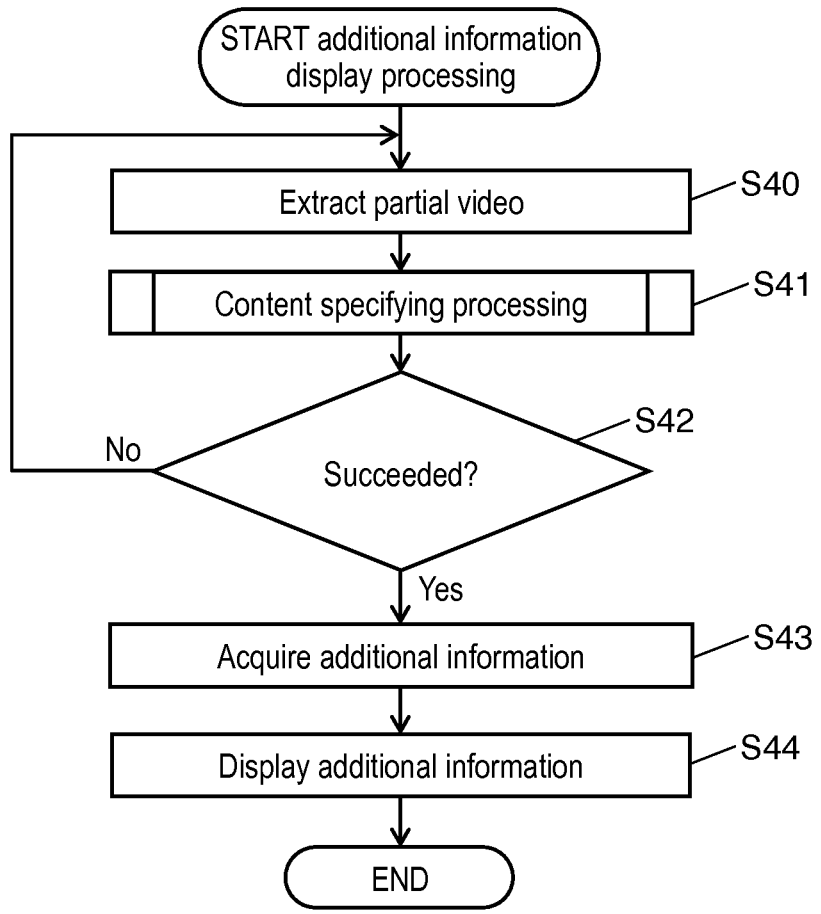
FIG. 5 is a flowchart schematically showing operations of additional information display processing performed by the video reception device in the first exemplary embodiment.

FIG. 5 is a flowchart schematically showing operations of the additional information display processing performed by video reception device 40 in the first exemplary embodiment.

Video extraction unit 45 of video reception device 40 extracts the partial video from the video signal output from STB 14 and input to input unit 65 (step S40). This video signal is a video signal of a channel broadcast by broadcast station 12, received by STB 14, and selected by the user.

Next, video reception device 40 performs the following content specifying processing (step S41).

Video recognition unit 66 of video reception device 40 generates the fingerprint (terminal video recognition information) based on the partial video extracted by video extraction unit 45. When the online matching processing is performed by video reception device 40, the generated fingerprint (terminal video recognition information) is transmitted to video recognition device 20 through HTTP transmission/reception unit 42 by the instruction of control unit 41. Video recognition device 20 performs the content specifying processing, which is based on the video recognition processing using the fingerprint, and transmits the analysis information (result of the content specifying processing), which is related to the specified content, to video reception device 40 through communication network 16. At this time, in a case where video recognition device 20 fails in the content specifying processing, for example, video recognition device 20 may operate so as to transmit specific information such as "NG" or "0" as the analysis information to video reception device 40. Control unit 41 controls the respective circuit blocks to receive the analysis information (result of the content specifying processing) transmitted from video recognition device 20 and to store the received analysis information in storage unit 47. When the local matching processing is performed by video reception device 40, video recognition unit 66 collates the generated fingerprint (terminal video recognition information) with the local database stored in storage unit 47 of video reception device 40, and reads out the analysis information, which is based on the result of such collation, from storage unit 47. Details of the content specifying processing will be described later.

Control unit 41 determines whether or not the content specifying processing in step S41 has succeeded (step S42), and if the content specifying processing has not succeeded (No), instructs the respective circuit blocks to perform operations of steps S40 and S41 one more time. If the content specifying processing has succeeded (Yes), the processing proceeds to a next step. In step S42, for example, if the analysis information is the specific information (for example, "NG", "0" and the like), then it can be determined that the content specifying processing has not succeeded.

Next, video reception device 40 acquires the additional information based on the analysis information (step S43). Control unit 41 of video reception device 40 controls the respective circuit blocks to transmit the analysis information, which is received from video recognition device 20 by the online matching processing in step S41, or the analysis information read out from storage unit 47 by the local matching processing in step S41, to additional information distribution device 30 through HTTP transmission/reception unit 42 and communication network 16. Additional information distribution device 30 transmits the additional information, which is related to the received analysis information, to video reception device 40 through communication network 16. Control unit 41 controls the respective circuit blocks to receive the additional information, which is transmitted from additional information distribution device 30, and to store the received additional information in storage unit 47.

For example, this analysis information may include an URL regarding a commercial product of a commercial product image included in the partial video. In that case, control unit 41 may operate so as to access additional information distribution device 30 while designating the URL, and to acquire information, which is related to the URL, as the additional information, which is related to the analysis information, from additional information distribution device 30. For example, this additional information may be advertisement information related to the commercial product. Moreover, additional information distribution device 30 may return the display control information for the additional information to video reception device 40 together with the additional information.

Control unit 41 controls the respective circuit blocks to transfer the received additional information (for example, advertisement information) to video output unit 44, and to superimpose the additional information on the video being displayed on displaying unit 54 and to display the additional information based on the instruction from additional information display control unit 46 (step S44). Based on the display control information for the additional information, which is acquired together with the additional information, and the like, additional information display control unit 46 determines display position, display size, display time and the like of the additional information, and issues an instruction that is based on such a determination to control unit 41. In this way, the received additional information (for example, advertisement information) is superimposed and displayed on the video being displayed on displaying unit 54, for example, according to the display position, the display size and the display time, which are instructed by additional information display control unit 46.

When a series of the above-mentioned additional information display processing is ended for one partial video, video reception device 40 extracts a next partial video and repeats additional information display processing similar to that mentioned above.

Note that control unit 41 may detect a state of the video signal, and may control the display of the additional information based on a result of such detection. For example, at a time it is detected that a caption or an OSD (On Screen Display) is superimposed on the video signal, control unit 41 may control the respective circuit blocks not to display the additional information in a period or a region, in which the caption or the OSD is displayed, but to display the additional information in a period or a region, in which the caption or the OSD is not displayed.

Next, a description is made of the content specifying processing in step S41.

[1-2-2. Operations of Content Specifying Processing]

Figure 6:
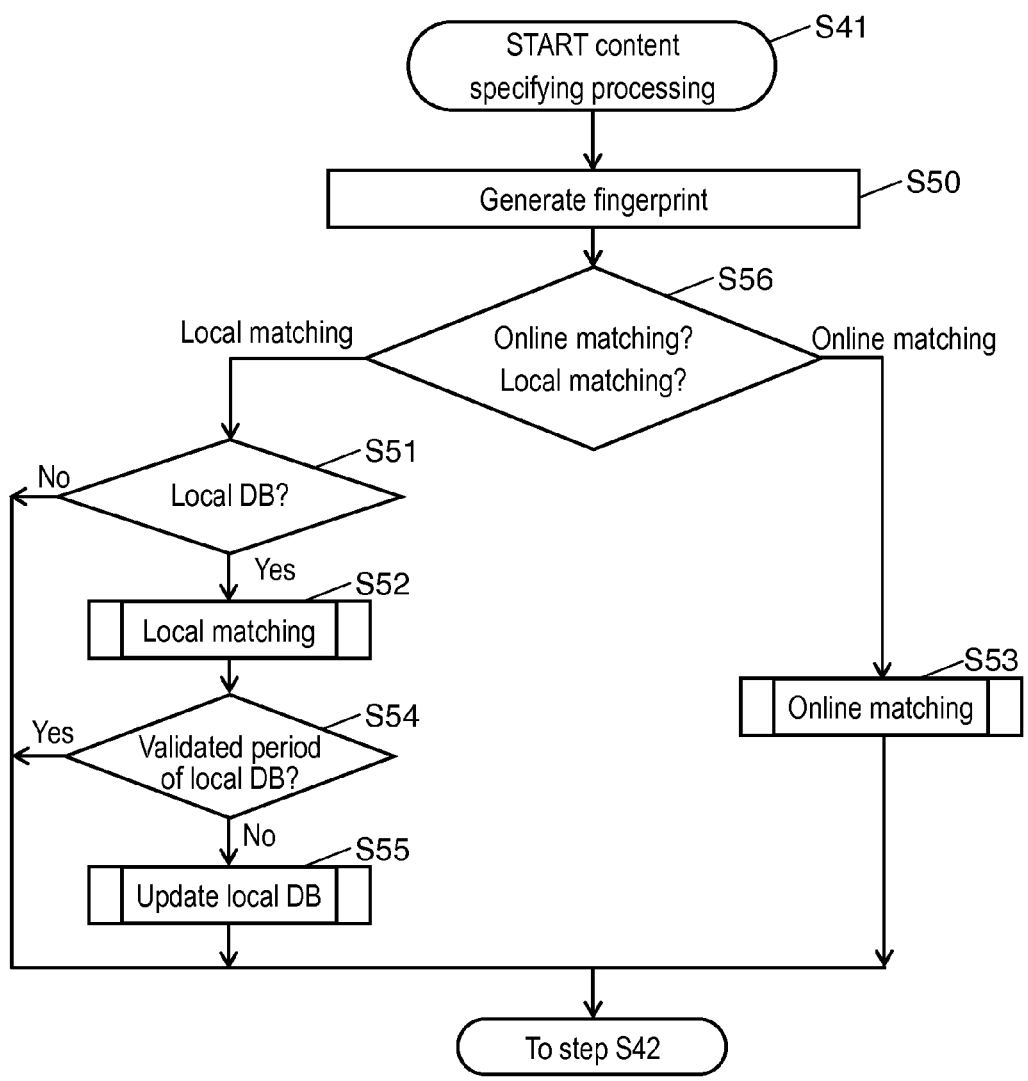
FIG. 6 is a flowchart schematically showing operations of content specifying processing performed by the video reception device in the first exemplary embodiment.

FIG. 6 is a flowchart schematically showing operations of the content specifying processing performed by video reception device 40 in the first exemplary embodiment.

First, video recognition unit 66 of video reception device 40 generates the fingerprint (terminal video recognition information) from the partial video, which is extracted by video extraction unit 45, based on the instruction of control unit 41 (step S50).

The fingerprint generated by control unit 41 is the hash value of each image that composes the partial video. However, this exemplary embodiment never limits the content recognition information to the hash value. The content recognition information just needs to be information (data) usable for the video recognition processing.

Next, control unit 41 selects which of the online matching processing and the local matching processing is to be performed (step S56).

For example, such selection in step S56 may be configured to be determined by control unit 41 based on conditions set in advance, or may be configured to be selected by user's setting.

As such advance setting conditions for allowing control unit 41 to make the determination, for example, the following condition can be mentioned as an example thereof. Immediately after the power supply is turned on to video reception device 40, and after the local database is updated, first, control unit 41 performs the local matching processing, and continues the local matching processing in a case of having succeeded in the local matching processing, and switches to the online matching processing in a case of having failed in the local matching processing.

This operation example is merely an example, and this exemplary embodiment is never limited to this operation example. Desirably, the selection between the online matching processing and the local matching processing is appropriately performed based on specifications of video reception device 40, specifications of additional information display system 10, and the like.

If the local matching processing is selected in step S56, the processing proceeds to next step S51.

Control unit 41 determines whether or not the local database is stored in storage unit 47 (step S51). Note that, in the drawings, the local database is abbreviated as a "local DB".

When it is determined in step S51 that the local database is stored in storage unit 47 (Yes), control unit 41 instructs video recognition unit 66 to perform the local matching processing, and video recognition unit 66 performs the local matching processing based on such an instruction (step S52). Details of the local matching processing will be described later.

Next, control unit 41 determines a validated period of the local database stored in storage unit 47 (step S54).

When it is determined in step S54 that the validated period of the local database has already elapsed, and that the local database cannot be used for the content specifying processing (No), control unit 41 controls the respective circuit blocks to update the local database (step S55). Details of such update processing for the local database will be described later. Note that, in step S54, "No" is selected, for example, when it is determined that the content in the local database is one that was broadcast in the past.

Note that the local database may be configured to be updated after the power supply to video reception device 40 is turned on or off, after the reception channel is switched, and so on.

When it is determined in step S51 that the local database is not stored in storage unit 47 (No), the local matching processing is not performed, but the processing proceeds to step S42 of FIG. 5. At this time, it is determined in step S42 that the content specifying processing has not succeeded (No).

Note that, when it is determined in step S51 that the local database is not stored in storage unit 47 (No), the processing may proceed to step S55, where the operation is performed so as to newly acquire the local database.

When it is determined in step S54 that the local database is one within the validated period, and that the local database can be used for the content specifying processing (Yes), the update of the local database is not performed, and the processing proceeds to step S42 of FIG. 5. In step S42, the determination, which is based on a result of the local matching processing performed in step S52, is made.

If the online matching processing is selected in step S56, control unit 41 instructs video recognition unit 66 to perform the online matching processing, and video recognition unit 66 performs the online matching processing based on such an instruction (step S53). In step S53, control unit 41 controls the respective circuit blocks to transmit the fingerprint (terminal video recognition information) generated in step S50 to video recognition device 20, and to request video recognition device 20 to perform the content specifying processing (content specifying processing based on video recognition processing). Moreover, control unit 41 controls the respective circuit blocks to receive the analysis information, which is transmitted as a result of the online matching processing from video recognition device 20, and to store the received analysis information in storage unit 47. Details of the online matching processing will be described later.

When the online matching processing of step S53 is ended, the processing proceeds to step S42 of FIG. 5. In step S42, the determination, which is based on a result of the online matching processing performed in step S53, is made.

Next, a description is made of the local matching processing of step S52.

[1-2-3. Operations of Local Matching Processing]

Figure 7:
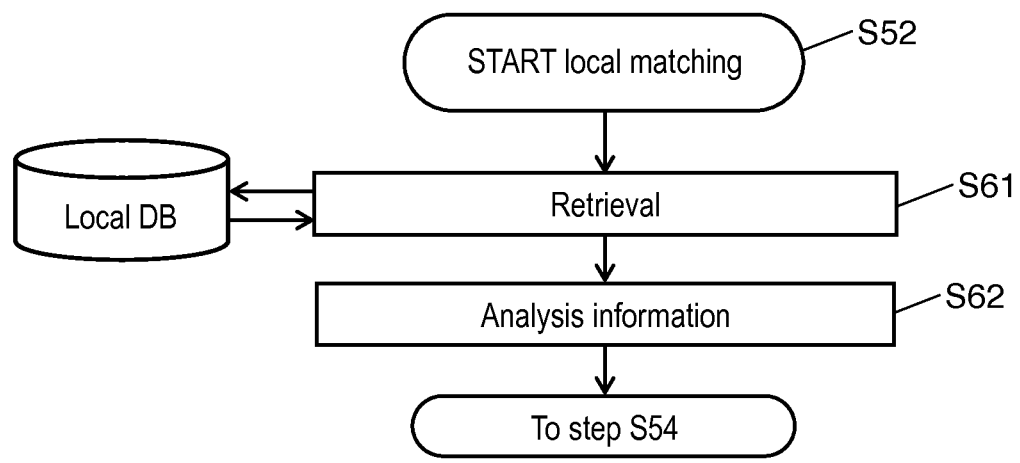
FIG. 7 is a flowchart schematically showing operations of the local matching processing performed by the video reception device in the first exemplary embodiment.

FIG. 7 is a flowchart schematically showing operations of the local matching processing performed by video reception device 40 in the first exemplary embodiment.

In order to specify the content which corresponds to the partial video by the local matching processing, video recognition device 66 of video reception device 40 collates the fingerprint (terminal video recognition information), which is generated from the partial video in step S50, with the fingerprint (server video recognition information), which is included in the local database stored in storage unit 47 of video reception device 40, thereby performs the video recognition processing, and retrieves server video recognition information that coincides with the terminal video recognition information (step S61). Video recognition unit 66 performs these operations while instructing control unit 41 to perform control required for the collation. Note that, in step S61, video recognition unit 66 may operate so as to retrieve server video recognition information in which a degree of similarity to the terminal video recognition information is a predetermined numeric value (for example, 60%) or more.

In step S61, if the server video recognition information that coincides with the terminal video recognition information can be found from the local database, video recognition unit 66 reads out the analysis information which is related to the content corresponding to the server video recognition information from storage unit 47 (local database), and outputs the analysis information to control unit 41 (step S62).

In this way, in the local matching processing, the content specifying processing (content specifying processing that is based on the video recognition processing) for the fingerprint (terminal video recognition information) generated from the partial video is performed.

When it is determined in step S61 that the server video recognition information that coincides with the terminal video recognition information is not present in the local database (or that only server video recognition information in which the degree of similarity to the terminal video recognition information is less than the predetermined numeric value is present), then in step S62, information (for example, "NG", "0" and the like) indicating that the content specifying processing has not succeeded is output as the analysis information to control unit 41.

Thereafter, the processing proceeds to step S54 of FIG. 6.

Next, a description is made of the online matching processing of step S53.

[1-2-4. Operations of Online Matching Processing]

Figure 8:
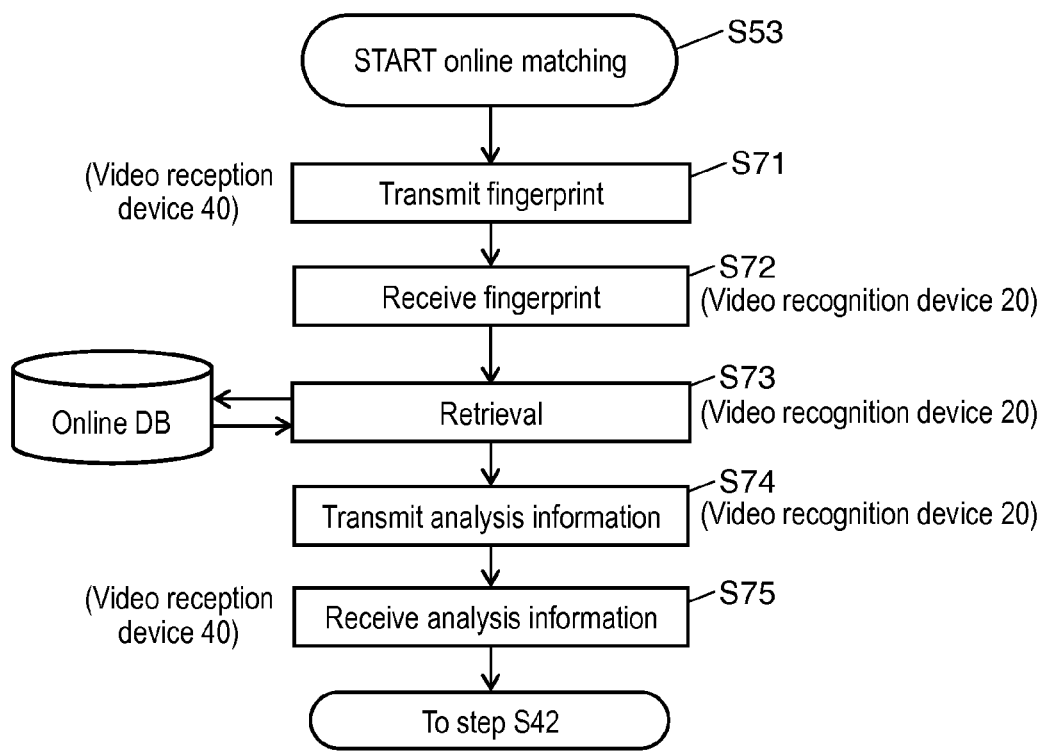
FIG. 8 is a flowchart schematically showing operations of the online matching processing performed by the video reception device and the video recognition device in the first exemplary embodiment.

FIG. 8 is a flowchart schematically showing operations of the online matching processing performed by video reception device 40 and video recognition device 20 in the first exemplary embodiment.

In order to specify the content which corresponds to the partial video by the online matching processing, video recognition unit 66 of video reception device 40 instructs control unit 41 to transmit the fingerprint (terminal video recognition information), which is generated from the partial video in step S50, to video recognition device 20 together with the video recognition request (step S71).

Based on such an instruction, control unit 41 controls the respective circuit blocks to transmit the terminal video recognition information and the video recognition request to video recognition device 20.

Video recognition device 20 receives the fingerprint (terminal video recognition information) and the video recognition request, which are transmitted from video reception device 40 through communication network 16 (step S72).

Retrieving unit 22 of video recognition device 20 collates the terminal video recognition information, which is received in step S72, with the fingerprint (server video recognition information) of the online database (abbreviated as an "online DB" in the drawings) stored in storage unit 23 of video recognition device 20, thereby performs the video recognition processing, and retrieves the server video recognition information that coincides with the terminal video recognition information (step S73).

Note that, in step S73, video recognition device 20 may operate so as to retrieve the server video recognition information in which the degree of similarity to the terminal video recognition information is a predetermined numeric value (for example, 60%) or more.

In step S73, if the server video recognition information that coincides with the terminal video recognition information can be found from the online database, retrieving unit 22 specifies the content corresponding to the server video recognition information (content specifying processing), reads out the analysis information which is associated with the content from storage unit 23 (online database), and transmits the analysis information to video reception device 40 (step S74).

In this way, in the online matching processing, the content specifying processing (content specifying processing that is based on the video recognition processing) for the fingerprint (terminal video recognition information) generated from the partial video is performed.

When it is determined in step S73 that the server video recognition information that coincides with the terminal video recognition information is not present in the online database (or that only the server video recognition information in which the degree of similarity to the terminal video recognition information is less than the predetermined numeric value is present), then in step S74, information (for example, "NG", "0" and the like) indicating that the content specifying processing has not succeeded is output as the analysis information to video reception device 40.

Control unit 41 of video reception device 40 controls the respective circuit blocks to receive the analysis information, and to store the received analysis information in storage unit 47 (step S75).

Thereafter, the processing proceeds to step S42 of FIG. 5.

Next, a description is made of the update processing for the local database in step S55.

[1-2-5. Operations of Local Database Update Processing]

In this exemplary embodiment, the local database stored in storage unit 47 is updated in the following manner.

Based on the viewing history (viewing history of video reception device 40, which is stored in storage unit 23 of video recognition device 20, and is acquired from video recognition device 20 by video reception device 40) stored in storage unit 47 of video reception device 40, video reception device 40 estimates highly probable time zone and channel (or content) of the next viewing on video reception device 40. This channel may be a channel selected by the user in the video transmission device such as STB 14, or may be a channel selected by a tuner owned by video reception device 40. This estimation is transmitted to video recognition device 20 from video reception device 40, and video recognition device 20 generates, from the online database, a local database having a fingerprint (server video recognition information) and analysis information, which are associated with the estimated time zone and channel (or content). The local database is transmitted from video recognition device 20 to video reception device 40, and is stored in storage unit 47 of video reception device 40. In this way, the local database is updated.

Details of the operations are described by using a flowchart.

Figure 9:
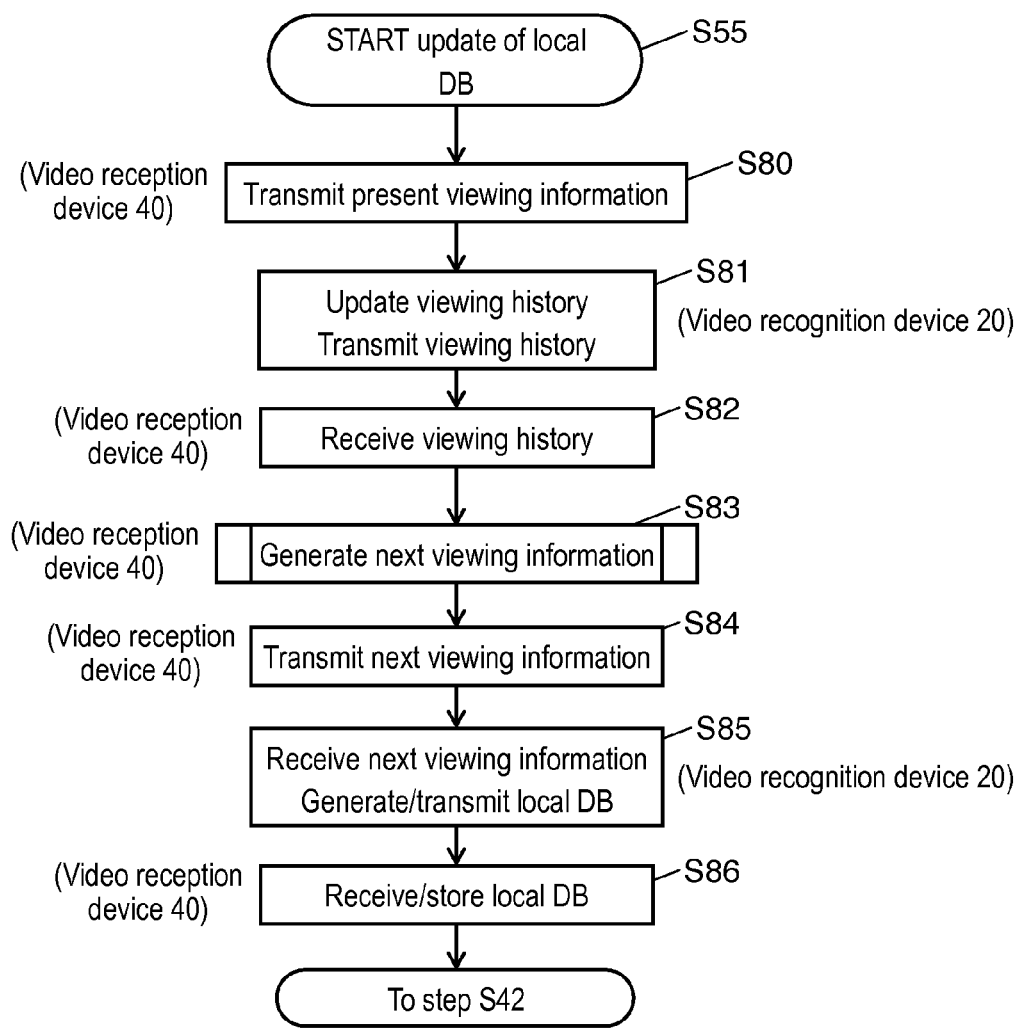
FIG. 9 is a flowchart schematically showing operations of local database update processing performed by the video reception device and the video recognition device in the first exemplary embodiment.

FIG. 9 is a flowchart schematically showing the operations of the local database update processing performed by video reception device 40 and video recognition device 20 in the first exemplary embodiment.

Control unit 41 of video reception device 40 controls the respective circuit blocks to transmit present viewing information (for example, a present viewing channel, a viewing start time, and the like) to video recognition device 20 (step S80).

Video recognition device 20 receives the present viewing information transmitted from video reception device 40, adds the received viewing information to the viewing history of video reception device 40, which is stored in storage unit 23, and updates the viewing history of video reception device 40. Specifically, this viewing history is information indicating a history from the past to the present, the history including channels (or content), time and date, and the like of the past viewing on video reception device 40. Then, information on the updated viewing history is transmitted from video recognition device 20 to video reception device 40 (step S81).

Note that video recognition device 20 can grasp a viewing status of video reception device 40 by the content specifying processing performed based on the fingerprint (terminal video recognition information) transmitted from video reception device 40, and accordingly, can also be configured to update the viewing history of video reception device 40, which is stored in storage unit 23, based on the result of the content specifying processing.

Control unit 41 of video reception device 40 controls the respective circuit blocks to receive the information on the viewing history, which is transmitted from video recognition device 20, and to store the received information in storage unit 47 (step S82).

Note that, in this exemplary embodiment, it is assumed that a viewing history of past five weeks or more from the present point of time is stored in storage unit 23 of video recognition device 20, and that information on a viewing history of at least the past five weeks from the present point of time is transmitted from video recognition device 20 to video reception device 40 and is stored in storage unit 47 of video reception device 40; however, desirably, such a storage target period of the viewing history is set as appropriate according to specifications of additional information display system 10, and the like.

Based on the information on the viewing history stored in storage unit 47 and on the present viewing information, video recognition unit 66 of video reception device 40 generates next viewing information that is information for generating the local database (step S83). The next viewing information refers to information including information regarding probable channel and time zone of the next viewing. Generation processing for the next viewing information will be described later.

The generated next viewing information is transmitted from video reception device 40 to video recognition device 20 (step S84). That is to say, "estimation" mentioned above refers to this next viewing information.

Video recognition device 20 receives the next viewing information transmitted from video reception device 40, and performs retrieval from the online database based on the information included in the received next viewing information. If content corresponding to the information (information on the channel estimated to be viewed next time and the time zone thereof) included in the next viewing information can be found from the online database, then video recognition device 20 generates a local database having a fingerprint (server video recognition information) and analysis information regarding the content. Note that this analysis information may include broadcast program meta information of an electronic broadcast program guide and the like. Then, video recognition device 20 transmits the generated local database to video reception device 40 through communication network 16 (step S85).

Control unit 41 of video reception device 40 controls the respective circuit blocks to receive the local database, which is transmitted from video recognition device 20, and to store the received local database in storage unit 47 (step S86). In this way, the local database in storage unit 47 is updated.

When the update processing for the local database is ended, the processing proceeds to step S42 of FIG. 5.

Note that, in the flowchart shown in FIG. 6, a configuration is shown, in which the update processing for the local database is performed after the local matching processing; however, this exemplary embodiment is never limited to this configuration. For example, the update processing for the local database may be performed immediately after the power supply to video reception device 40 is turned on, or may be performed after the channel is switched. Alternatively, a backup power supply may be provided in video reception device 40, and the update processing for the local database may be performed by using the backup power supply after the power supply to video reception device 40 is turned off. Desirably, the update processing for the local database is performed as appropriate in order to enhance the accuracy of the local matching processing.

Next, a description is made of the generation processing for the next viewing information in step S83.

[1-2-6. Operations of Next Viewing Information Generation Processing]

Based on the viewing history and the present viewing information (channel being viewed by the user), video recognition unit 66 of video reception device 40 grasps a viewing tendency of the user, and estimates the time zone in which the user performs the viewing next and the channel thereof. The next viewing information includes information on the estimated time zone and channel.

Details of the operations are described by using a flowchart.

Figure 10:
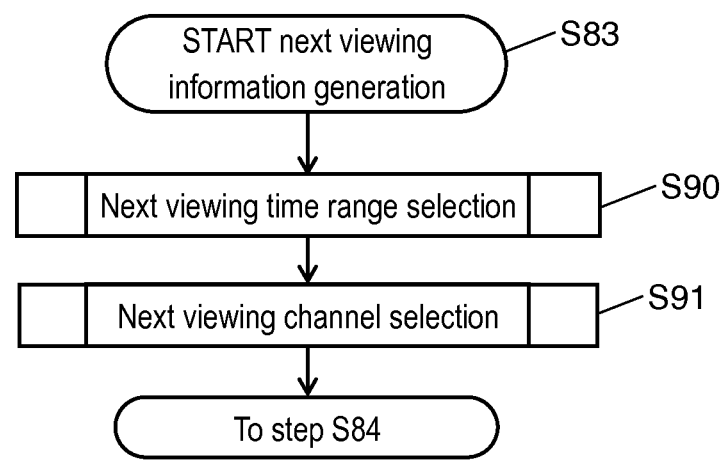
FIG. 10 is a flowchart schematically showing operations of next viewing information generation processing performed by the video reception device in the first exemplary embodiment.

FIG. 10 is a flowchart schematically showing operations of the next viewing information generation processing performed by video reception device 40 in the first exemplary embodiment.

Video recognition unit 66 selects a "next viewing time zone" (step S90). The next viewing time zone refers to a time zone in which the user is estimated to view the content next. Details of this next viewing time zone selection processing will be described later.

Next, video recognition unit 66 selects a "next viewing channel" (step S91). The next viewing channel refers to a channel which the user is estimated to view next. Details of this next viewing channel selection processing will be described later.

Then, video reception device 40 generates the next viewing information including: information on the next viewing time zone selected in step S90; and information on the next viewing channel selected in step S91.

When the next viewing information generation processing is ended, the processing proceeds to step S84 of FIG. 9.

The next viewing information is transmitted from video reception device 40 to video recognition device 20, whereby a local database that is based on the next viewing information is generated in video recognition device 20. Then, the generated local database is transmitted from video recognition device 20 to video reception device 40, whereby video reception device 40 can acquire and update the local database.

Next, a description is made of the selection processing for the next viewing time zone in step S90.

[1-2-7. Operations of Next Viewing Time Zone Selection Processing]

Video recognition unit 66 of video reception device 40 divides one day (24 hours) into a plurality of time zones, calculates a "next viewing time zone likelihood" in each of time zones of a predetermined period (for example, one week) on and after a time zone (referred to as a "present time zone") to which the present point of time belongs, and selects a time zone, in which the "next viewing time zone likelihood" is the highest, as a "next viewing time zone". The next viewing time zone likelihood is one in which a possibility that the user may perform the viewing in the time zone concerned is digitized. A calculation expression of the next viewing time zone likelihood is set so that a numeric value thereof is larger in a time zone in which the possibility that the user may perform the viewing is higher. In this exemplary embodiment, the next viewing time zone likelihood is calculated, whereby the time zone (next viewing time zone) in which the user performs the viewing next is estimated and selected.

Video recognition unit 66 digitizes a time difference between the present point of time and each of the time zones, a viewing frequency and a viewing custom in the past in each of the time zones, presence of a recording setting (viewing setting) and the like, and calculates the next viewing time zone likelihood based on numeric values thus obtained. The next viewing time zone likelihood is set so that the numeric value thereof is larger in a time zone closer to the present point of time, that the numeric value is larger in a time zone in which the past viewing frequency is higher and the viewing custom is present, and that the numeric value is larger in a time zone in which the recording setting (or the viewing setting) is present.

Details of these operations are described by using a flowchart.

Figure 11:
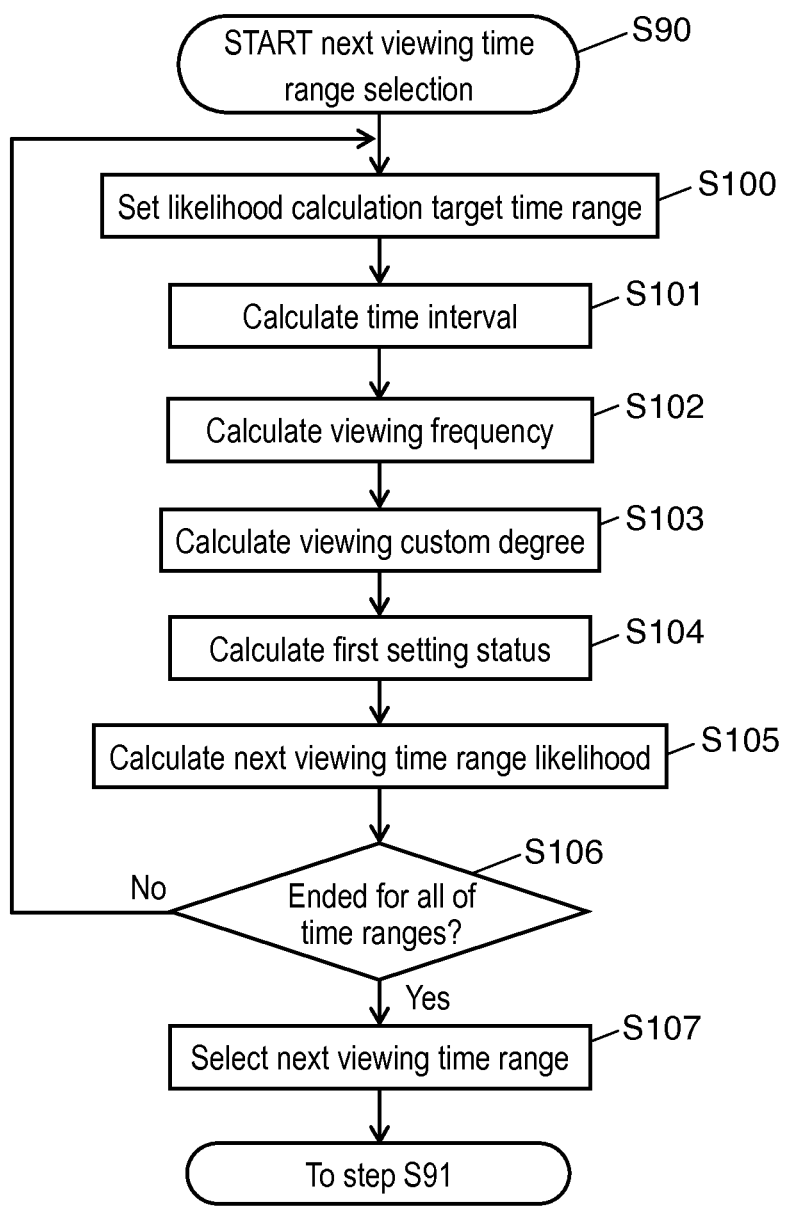
FIG. 11 is a flowchart schematically showing operations of next viewing time zone selection processing performed by the video reception device in the first exemplary embodiment.

FIG. 11 is a flowchart schematically showing operations of the next viewing time zone selection processing performed by video reception device 40 in the first exemplary embodiment.

First, video recognition unit 66 divides one day (24 hours) into a plurality of time zones, selects one time zone in a predetermined period (for example, one week) on and after the time zone ("present time zone") to which the present point of time belongs, and sets the selected time zone as a calculation target time zone of the next viewing time zone likelihood (step S100). Hereinafter, the calculation target time zone of the next viewing time zone likelihood is abbreviated as a "likelihood calculation target time zone".

Note that this predetermined time, that is, the calculation target period of the next viewing time zone likelihood is never limited to one week, and may be one week or more, or may be less than one week. Desirably, this predetermined period is set as appropriate according to the specifications of additional information display system 10, and the like.

Next, video recognition unit 66 calculates a "time interval" based on a time difference between the present point of time and the likelihood calculation target time zone (step S101). This "time interval" refers to a numeric value calculated based on the time difference between the present point of time and the likelihood calculation target time zone, and based on a predetermined weighting factor ($\alpha$), and is set so that the numeric value is larger as the time difference is smaller. A specific calculation example of the "time interval" will be described later.

Next, video recognition unit 66 calculates a "viewing frequency" in the likelihood calculation target time zone based on the viewing history stored in storage unit 47 (step S102). This "viewing frequency" refers to a numeric value, which is calculated based on a "first number of viewing times" and a predetermined weighting factor ($\gamma$), and is set so that the numeric value is larger as the "first number of viewing times" is larger. The "first number of viewing times" is a numeric value, which indicates the number of times that the user has performed the viewing in the same time zone as the likelihood calculation target time zone on the same day of the week as a day of the week to which the likelihood calculation target time zone belongs, in a predetermined past period that is a viewing history retrieval range for calculating the next viewing time zone likelihood.

For example, it is assumed that such a predetermined past period is set at five weeks, the next viewing time zone likelihood is set so as to be calculated based on a viewing history of the past five weeks from the present time zone, and a time zone of 20:00 to 24:00 on Monday of a current week is set as the likelihood calculation target time zone. In this case, video recognition unit 66 refers to the viewing history stored in storage unit 47, checks whether or not the viewing has been performed in the time zone of 20:00 to 24:00 on each of Mondays of the past five weeks from the present time zone, and calculates the "first number of viewing times". If there are viewing histories in the time zones of 20:00 to 24:00 on the respective Mondays of the past five weeks, then the "first number of viewing times" is "five". This "first number of viewing times" is multiplied by the predetermined weighting factor ($\gamma$), whereby the "viewing frequency" is calculated. A specific calculation example of the "viewing frequency" will be described later.

Next, video recognition unit 66 calculates a "viewing custom degree" in the likelihood calculation target time zone based on the viewing history stored in storage unit 47 (step S103). This "viewing custom degree" is a numeric value, which indicates to which extent the user has customarily performed the viewing in the same time zone as the likelihood calculation target time zone on the same day of the week as the day of the week to which the likelihood calculation target time zone belongs in the predetermined past period, and is set so that the numeric value is larger as the degree of customary viewing is higher. Video recognition unit 66 calculates a "standard deviation" based on the viewing history, which is stored in storage unit 47, and based on the likelihood calculation target time zone, and calculates the "viewing custom degree" based on the "standard deviation" and a predetermined weighting factor ($\beta$). A specific calculation example of the "viewing custom degree" will be described later.

Next, video recognition unit 66 confirms whether or not there is a recording setting (or a viewing setting) in the likelihood calculation target time zone, and digitizes a result of the confirmation based on a predetermined weighting factor ($\delta$) (step S104). Hereinafter, such a numeric value thus obtained is referred to as a "first setting status". A specific calculation example of the "first setting status" will be described later.

Then, video recognition unit 66 calculates the "next viewing time zone likelihood" in the likelihood calculation target time zone, which is set in step S100, from the "time interval" calculated in step S101, the "viewing frequency" calculated in step S102, the "viewing custom degree" calculated in step S103, and the "first setting status" calculated in step S104 (step S105). The "next viewing time zone likelihood" calculated here is made identifiable regarding for which time zone the calculation is made, and is stored in storage unit 47. A specific calculation example of the "next viewing time zone likelihood" will be described later.

Next, video recognition unit 66 determines whether or not the calculation of the next viewing time zone likelihood is ended for all of the time zones of the predetermined period (step S106).

When it is determined in step S106 that a time zone for which the next viewing time zone likelihood is not calculated is present in the predetermined period (No), video recognition unit 66 returns to step S100, sets the time zone for which the next viewing time zone likelihood is not calculated as a new likelihood calculation target time zone, and repeats a series of the above-mentioned operations.

When it is determined in step S106 that the calculation of the next viewing time zone likelihood is ended for all of the time zones in the predetermined time (Yes), video recognition unit 66 compares with one another the next viewing time zone likelihoods for which the calculation is ended, and selects a time zone in which the next viewing time zone likelihood is the highest, as the "next viewing time zone" (step S107).

When the next viewing time zone selection processing is ended, the processing proceeds to step S91 of FIG. 10.

Note that the respective steps, which are: step S101 of calculating the "time interval"; step S102 of calculating the "viewing frequency"; step S103 of calculating the "viewing custom degree"; and step S104 of calculating the "first setting status", are never limited to this order, and may be performed in any order.

Note that the predetermined past period, that is, a viewing history retrieval range for calculating the next viewing time zone likelihood, is never limited to five weeks, and may be five weeks or more, or may be less than five weeks. Desirably, the predetermined past period is set as appropriate according to the specifications of additional information display system 10, and the like.

Next, a description is made of an example of specific operations of the next viewing time zone selection processing with reference to the drawings.

Figure 12:
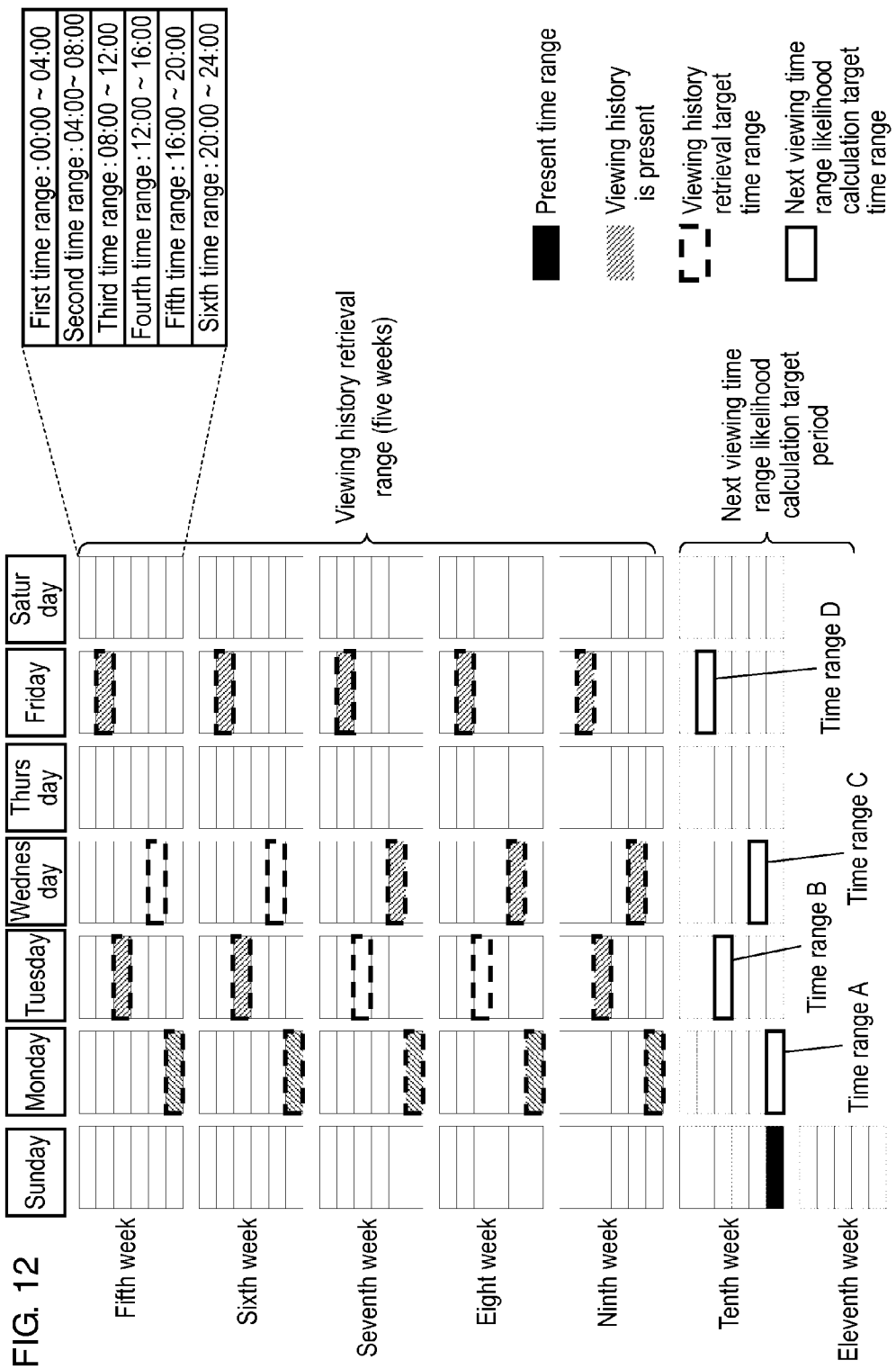
FIG. 12 is a schematic diagram schematically showing an example of the operations of next viewing time zone selection processing performed by the video reception device in the first exemplary embodiment.

FIG. 12 is a schematic diagram schematically showing an example of the operations of next viewing time zone selection processing performed by video reception device 40 in the first exemplary embodiment.

FIG. 12 shows an example of dividing 24 hours into six time zones, which are a first time zone to a sixth time zone, and each have four hours, and setting the respective time zones to 0:00 to 4:00 (first time zone), 4:00 to 8:00 (second time zone), 8:00 to 12:00 (third time zone), 12:00 to 16:00 (fourth time zone) 16:00 to 20:00 (fifth time zone) and 20:00 to 24:00 (sixth time zone).

Moreover, in the example shown in FIG. 12, a current week is assumed to be a tenth week, and the present time zone is assumed to be the sixth time zone (20:00 to 24:00) on Sunday of the tenth week.

Furthermore, in the example shown in FIG. 12, the predetermined past period, that is, the viewing history retrieval range for calculating the next viewing time zone likelihood, is set at five weeks, and a setting is made so that the next viewing time zone likelihood is calculated based on the viewing history of the past five weeks (from the sixth time zone on Sunday of the fifth week to the fifth time zone on Sunday of the tenth week) from the present time zone.

Hence, it is assumed that information on the viewing history of at least the past five weeks from the present point of time is acquired from video recognition device 20 and is stored in storage unit 47 of video reception device 40.

Moreover, in the example shown in FIG. 12, the predetermined period, which is the calculation target period for the next viewing time zone likelihood, is set at one week, and the respective time zones of one week (from the first time zone on Monday of the tenth week to the sixth time zone on Sunday of the eleventh week) on and after the present time zone are set as calculation targets of the next viewing time zone likelihood.

Note that, in video reception device 40, all of the time zones in the calculation target period are sequentially set as the likelihood calculation target time zones, and the next viewing time zone likelihoods are calculated in the respective time zones; however, here, as an example, a case is described, where four time zones, which are: a time zone A (sixth time zone on Monday of the tenth week); a time zone B (third time zone on Tuesday of the tenth week); a time zone C (fifth time zone on Wednesday of the tenth week); and a time zone D (second time zone on Friday of the tenth week), are set as the likelihood calculation target time zones, and the next viewing time zone likelihoods are calculated in these time zones.

FIG. 13 is a diagram showing an example of the next viewing time zone likelihoods calculated by video recognition unit 66 of video reception device 40 in the first exemplary embodiment.

FIG. 13 shows an example of the respective calculation values of the "time interval" calculated in step S101, the "viewing frequency" calculated in step S102, the "viewing custom degree" calculated in step S103, the "first setting status" calculated in step S104, and the "next viewing time zone likelihood" calculated in step S105 for the respective time zones shown in FIG. 12, which are the time zone A, the time zone B, the time zone C and the time zone D.

Video recognition unit 66 calculates the "time interval", which is described in step S101, by the following expression. Note that this exemplary embodiment illustrates an example where the weighting factor $\alpha$ is set at 4.

$$\text{Time interval} = \alpha \times \text{predetermined period}/(\text{time difference between likelihood calculation target time zone and present point of time})$$

In this calculation expression, the predetermined period is converted into hours. In the example shown in FIG. 12, the predetermined period is set at one week, and accordingly, the predetermined period for use in the above-mentioned expression is 168 hours=one week×24 hours. Moreover, for example, if the present point of time is 20:00 on Sunday of the tenth week, then as shown in FIG. 13, the time difference between the likelihood calculation target time zone and the present point of time is: 24 hours in the time zone A; 36 hours in the time zone B; 68 hours in the time zone C; and 104 hours in the time zone D. Hence, for example, the "time interval" of the time zone A is as follows.

$$\text{Time interval} = 4 \times 168/24 = 28$$

When the "time intervals" of the other time zones are calculated in a similar way, as shown in FIG. 13, the "time intervals" are 18.67 in the time zone B, 9.88 in the time zone C, and 6.46 in the time zone D.

Note that, in place of the time difference between the likelihood calculation target time zone and the present point of time, a difference between a start time of the present time zone and a start time of the likelihood calculation target time zone may be used.

Next, video recognition unit 66 calculates the "viewing frequency", which is described in step S102, by the following expression. Note that this exemplary embodiment illustrates an example where the weighting factor $\gamma$ is set at 3.

$$\text{Viewing frequency} = \gamma \times (\text{first number of viewing times of likelihood calculation target time zone})$$

The "first number of viewing times" is a numeric value, which indicates the number of times that the user has performed the viewing (of any channel) in the same time zone as the likelihood calculation target time zone on the same day of the week as a day of the week to which the likelihood calculation target time zone belongs, in the viewing history retrieval range (predetermined past period). For example, in the example shown in FIG. 12, the "first number of viewing times" regarding the time zone A is a sum total of the number of viewing times in the sixth time zones of the respective Mondays from the fifth week to the ninth week, and the "first number of viewing times" regarding the time zone B is a sum total of the number of viewing times in the third time zones of the respective Tuesdays from the firth week to the ninth week. In the example shown in FIG. 12, "the first number of viewing times" is 5 in the time zone A, 3 in the time zone B, 3 in the time zone C, and 5 in the time zone D. Hence, for example, the "viewing frequency" of the time zone A is as follows.

$$\text{Viewing frequency} = 3 \times 5 = 15$$

When the "viewing frequencies" of the other time zones are calculated in a similar way, as shown in FIG. 13, the "viewing frequencies" are 9 in the time zone B, 9 in the time zone C, and 15 in the time zone D.

Next, video recognition unit 66 calculates the "viewing custom degree", which is described in step S103, by the following Expression 1. Note that this exemplary embodiment illustrates an example where the weighting factor $\beta$ is set at 3.

[Expression 1]
$$F = \frac{\beta}{\left(\sqrt{\frac{(T1-Ta)^2+(T2-Ta)^2+(T3-Ta)^2+(T4-Ta)^2+(T5-Ta)^2}{Tf}}\right)+1}$$

Units of the respective numeric values in Expression 1 are "week".

In Expression 1,

F is the "viewing custom degree".

Tf is the "viewing history retrieval range". For example, in the example shown in FIG. 12, the viewing history retrieval range is five weeks, and accordingly, Tf=5 is established.

Ta is an average viewing internal in the same time zone as the likelihood calculation target time zone in the viewing history retrieval range. For example, in the example shown in FIG. 12, provided that the likelihood calculation target time zone is the time zone A, since the viewing has been performed in the sixth time zones on the respective Mondays from the fifth week to the ninth week, and accordingly, the average viewing interval Tf is established as: Tf=(1+1+1+1)/4=1. Provided that the likelihood calculation target time zone is the time zone B, since the viewing has been performed in the third time zones on the respective Tuesdays of the fifth week, the sixth week and the ninth week, and the viewing has not been performed in the third time zones of the respective Tuesdays of the sixth week and the seventh week, and accordingly, the average viewing interval Tf is established as: Tf=(1+3)/2=2.

T1 is a time difference between the likelihood calculation target time zone and the same time zone as that in which the viewing was performed last time. For example, in the example shown in FIG. 12, provided that the likelihood calculation target time zone is the time zone A, since the viewing has been performed in the sixth time zone on Monday of the ninth week, and accordingly, T1 is equal to 1 (T1=1).

T2 is a time difference between last-time viewing in the same time zone as that of the likelihood calculation target time zone and two-times-before viewing in the same time zone as that of the likelihood calculation target time zone. For example, in the example shown in FIG. 12, provided that the likelihood calculation target time zone is the time zone A, since the viewing has been performed in the sixth time zones on the respective Mondays of the eighth week and the ninth week, and accordingly, T2 is equal to 1 (T2=1). Provided that the likelihood calculation target time zone is the time zone B, since the viewing has been performed in the third time zones on the respective Tuesdays of the sixth week and the ninth week, and the viewing has not been performed in the third time zones of the respective Tuesdays of the seventh week and the eighth week, and accordingly, T2 is equal to 3 (T2=3).

T3 is a time difference between two-times-before viewing in the same time zone as that of the likelihood calculation target time zone and three-times-before viewing in the same time zone as that of the likelihood calculation target time zone. For example, in the example shown in FIG. 12, provided that the likelihood calculation target time zone is the time zone A, since the viewing has been performed in the sixth time zones on the respective Mondays of the seventh week and the eighth week, and accordingly, T3 is equal to 1 (T3=1).

T4 is a time difference between three-times-before viewing in the same time zone as that of the likelihood calculation target time zone and four-times-before viewing in the same time zone as that of the likelihood calculation target time zone. For example, in the example shown in FIG. 12, provided that the likelihood calculation target time zone is the time zone A, since the viewing has been performed in the sixth time zones on the respective Mondays of the sixth week and the seventh week, and accordingly, T4 is equal to 1 (T4=1).

T5 is a time difference between four-times-before viewing in the same time zone as that of the likelihood calculation target time zone and five-times-before viewing in the same time zone as that of the likelihood calculation target time zone. For example, in the example shown in FIG. 12, provided that the likelihood calculation target time zone is the time zone A, since the viewing has been performed in the sixth time zones on the respective Mondays of the fifth week and the sixth week, and accordingly, T5 is equal to 1 (T5=1).

Hence, for example, in the example shown in FIG. 12, the viewing custom degree F. regarding the time zone A is as follows.

[Expression 2]
$$F = \frac{3}{\left(\sqrt{\frac{(1-1)^2+(1-1)^2+(1-1)^2+(1-1)^2+(1-1)^2}{5}}\right)+1} = 3$$

The viewing custom degree F. regarding the time zone B is as follows in the example shown in FIG. 12.

[Expression 3]
$$F = \frac{3}{\left(\sqrt{\frac{(1-2)^2+(3-2)^2+(1-2)^2}{5}}\right)+1} = \frac{3}{\left(\sqrt{\frac{3}{5}}\right)+1} = 1.69$$

When the "viewing custom degrees" of the other time zones are calculated in a similar way, as shown in FIG. 13, the "viewing custom degrees" are 3 in the time zone C, and 3 in the time zone D.

Next, video recognition unit 66 calculates the "first setting status", which is described in step S104, by the following expression. Note that this exemplary embodiment illustrates an example where the weighting factor δ is set at 5.

First setting status=δ×presence of recording setting (or viewing setting) in likelihood calculation target time zone Note that, in this expression, 1 is assigned if there is a setting, and 0 is assigned if there is no setting. In the example shown in FIG. 12, no setting is made in any time zone of the time zone A, the time zone B, the time zone C and the time zone D, and accordingly, as shown in FIG. 13, the "first setting status" in each of the time zones is 0.

Next, video recognition unit 66 calculates the "next viewing time zone likelihood", which is described in step S105, by the following expression.

Next viewing time zone likelihood=time interval+ viewing frequency+viewing custom degree+first setting status For example, in the example shown in FIG. 12 and FIG. 13, the "next viewing time zone likelihood" of the time zone A is as follows.

Next viewing time zone likelihood=28+15+3+0=46

When the "next viewing time zone likelihoods" of the other time zones are calculated in a similar way, as shown in FIG. 13, the "next viewing time zone likelihoods" are 29.36 in the time zone B, 21.88 in the time zone C, and 24.46 in the time zone D.

Next, as described in step S107, video recognition unit 66 selects a time zone in which the next viewing time zone likelihood is the highest, as the "next viewing time zone". In the example shown in FIG. 12 and FIG. 13, a numeric value of the "next viewing time zone likelihood" of the time zone A is the largest. Hence, video recognition unit 66 estimates that the time zone A is a highest probable time zone in which the viewing may be performed next, and selects the time zone A as the "next viewing time zone".

Note that the respective setting values mentioned herein are merely examples, and in this exemplary embodiment, the respective setting values are never limited to the above-mentioned numeric values. Desirably, the respective setting values are set optimally according to the specifications of additional information display system 10, and the like.

Next, a description is made of the next viewing channel selection processing in step S91.

[1-2-8. Operations of Next Viewing Channel Selection Processing]

In the "next viewing time zone" selected in step S90, video recognition unit 66 of video reception device 40 calculates the "next viewing channel likelihoods" for each of all receivable channels, and selects a channel in which the "next viewing channel likelihood" is the highest, as the "next viewing channel". The next viewing channel likelihood is one in which the possibility that the user may view the channel concerned is digitized. A calculation expression of the next viewing channel likelihood is set so that a numeric value thereof is larger in the channel in which the possibility that the user may perform the viewing is higher. In this exemplary embodiment, the next viewing channel likelihood is calculated, whereby the channel (next viewing channel) which the user views in the next viewing time zone is estimated and selected.

Video recognition unit 66 digitizes the number of viewing times, presence of the recording setting (viewing setting) and the like of each of the channels, and calculates the next viewing channel likelihood based on the numeric values thus obtained. With regard to the next viewing channel likelihood, the numeric value thereof is larger as the number of viewing times in the past is larger, and the numeric value thereof is larger in such a channel in which the recording setting (or the viewing setting) is present in the next viewing time zone.

Details of these operations are described by using a flowchart.

Figure 14:
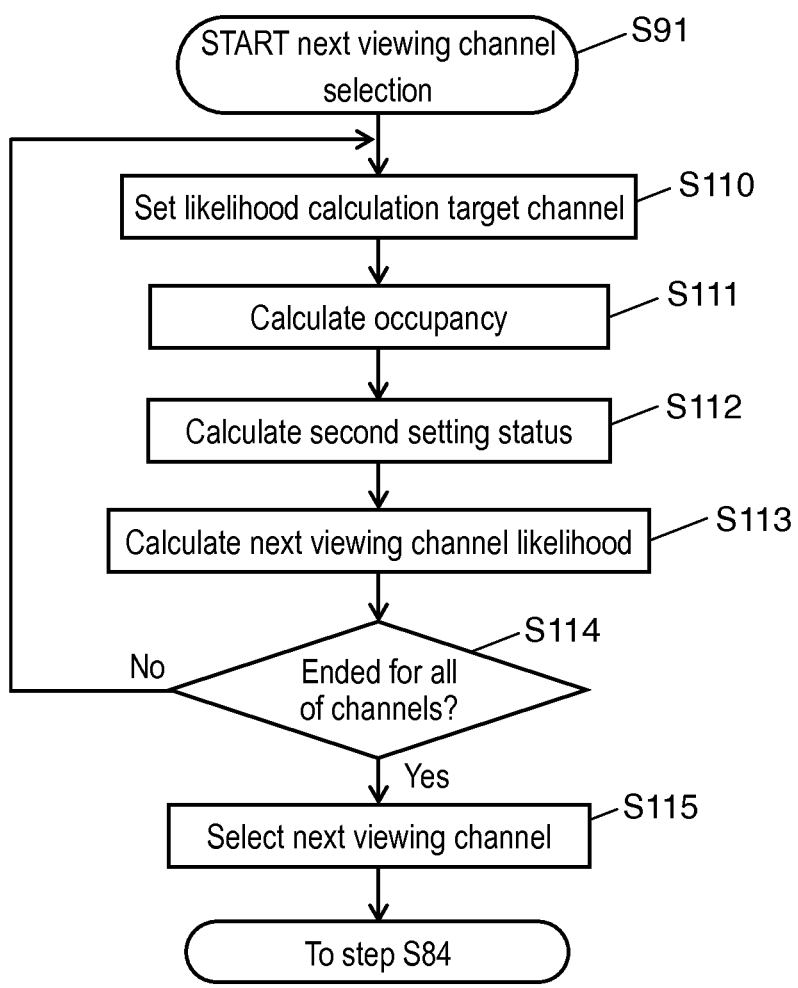
FIG. 14 is a flowchart schematically showing operations of next viewing channel selection processing performed by the video reception device in the first exemplary embodiment.

FIG. 14 is a flowchart schematically showing operations of next viewing channel selection processing performed by video reception device 40 in the first exemplary embodiment.

First, video recognition unit 66 selects one channel among the receivable channels, and sets the channel as a calculation target channel of the next viewing channel likelihood (step S110). Hereinafter, the calculation target channel of the next viewing channel likelihood is abbreviated as a "likelihood calculation target channel".

Next, video recognition unit 66 calculates an "occupancy" of the likelihood calculation target channel in the next viewing time zone selected in step S90 (step S111). The "occupancy" refers to a numeric value, which is calculated based on the "viewing history retrieval range", a "second number of viewing times" and a predetermined weighting factor ($\epsilon$), and is set so that the numeric value is larger as the "second number of viewing times" is larger. The "second number of viewing times" refers to a numeric value, which indicates the number of times that the user has viewed the likelihood calculation target channel in the same time zone as the next viewing time zone on the same day of the week as a day of the week to which the next viewing time zone belongs, in the viewing history retrieval range (above-mentioned predetermined past period).

For example, it is assumed that a time zone from 20:00 to 24:00 on Monday of a current week is selected as the next viewing time zone, that the fifth channel is set as the likelihood calculation target channel, that the viewing history retrieval range (predetermined past period) is set at five weeks, and that the next viewing channel likelihood is calculated based on the viewing history of the past five weeks from the present time zone. In this case, video recognition unit 66 refers to the viewing history stored in storage unit 47, checks whether or not the fifth channel has been viewed in the time zone from 20:00 to 24:00 on every Monday in the past five weeks from the present time zone, thereby calculates the "second number of viewing times", and calculates the "occupancy" based on the "second number of viewing times". A specific calculation example of the "occupancy" will be described later.

Next, video recognition unit 66 confirms whether or not there is a recording setting (or a viewing setting) in the next viewing time zone, and digitizes a result of the confirmation based on a predetermined weighting factor ($\zeta$) (step S112). Hereinafter, such a numeric value thus obtained is referred to as a "second setting status". A specific calculation example of the "second setting status" will be described later.

Then, from the "occupancy" calculated in step S111 and the "second setting status" calculated in step S112, video recognition unit 66 calculates the "next viewing channel likelihood" in the likelihood calculation target channel set in step S110 (step S113). The "next viewing channel likelihood" calculated here is made identifiable regarding for which channel the calculation is made, and is stored in storage unit 47. A specific calculation example of the "next viewing channel likelihood" will be described later.

Next, video recognition unit 66 determines whether or not the calculation of the next viewing channel likelihood in the next viewing time zone is ended for all of the receivable channels (step S114).

When it is determined in step 114 that there is a channel for which the next viewing channel likelihood is not calculated (No), then video recognition unit 66 returns to step S110, sets the channel for which the next viewing channel likelihood is not calculated, as a new likelihood calculation target channel, and repeats a series of the above-mentioned operations.

When it is determined in step S114 that the calculation of the next viewing channel likelihood is ended for all of the receivable channels (Yes), video recognition unit 66 compares with one another such next viewing channel likelihoods for which the calculation is ended, and selects a channel in which the next viewing channel likelihood is the highest, as the "next viewing channel" (step S115).

When the next viewing channel selection processing is ended, the processing proceeds to step S84 of FIG. 9.

Next, a description is made of an example of specific operations of the next viewing channel selection processing with reference to the drawings.

Figure 15:
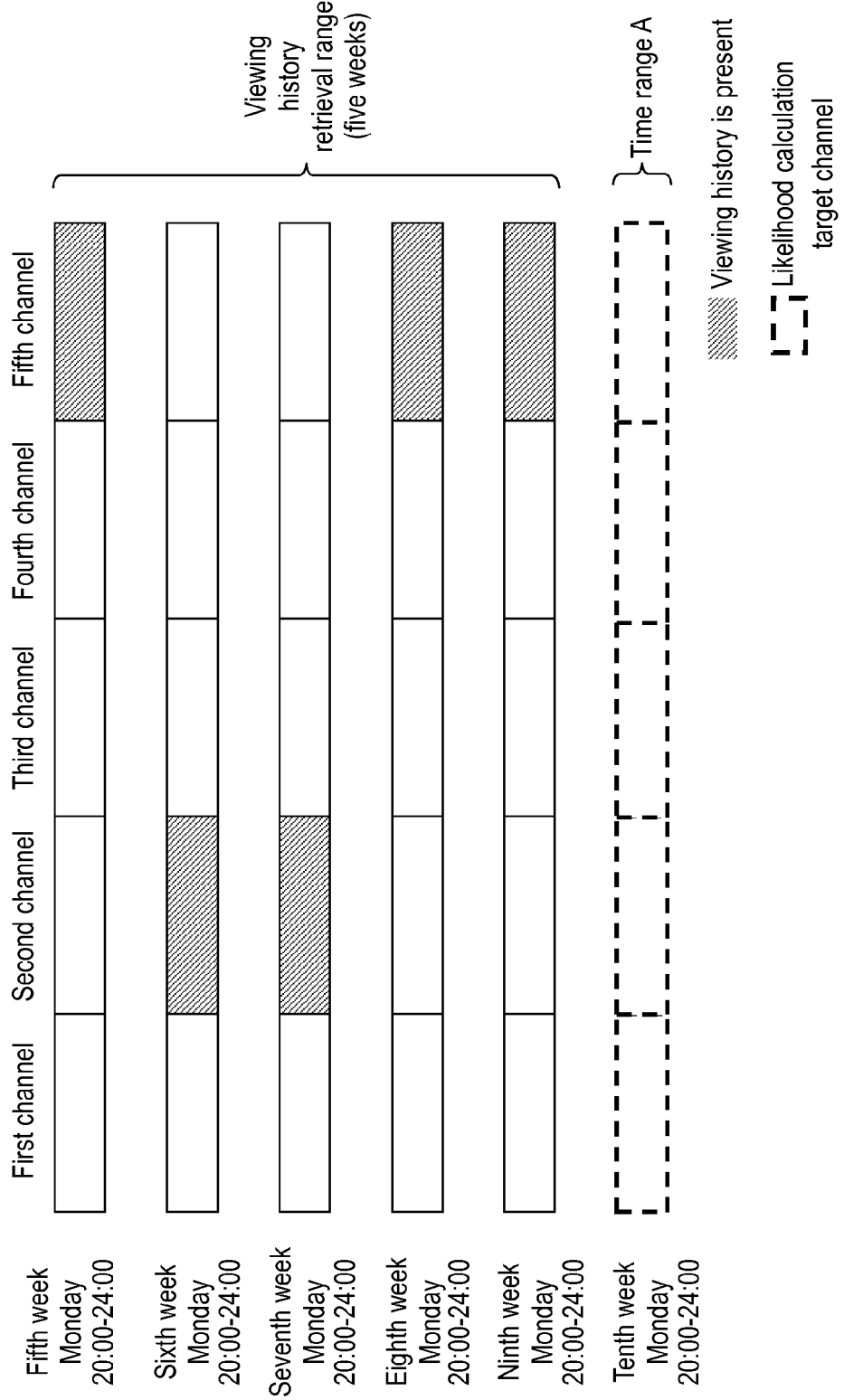
FIG. 15 is a schematic diagram schematically showing an example of the operations of the next viewing channel selection processing performed by the video reception device in the first exemplary embodiment.

FIG. 15 is a schematic diagram schematically showing an example of the operations of the next viewing channel selection processing performed by video reception device 40 in the first exemplary embodiment.

FIG. 15 shows an example where the time zone A (20:00 to 24:00 on Monday of the tenth week) is selected as the "next viewing time zone", and the next viewing channel selection processing is performed for five channels which are from the first channel to the fifth channel in the time zone A.

Moreover, in the example shown in FIG. 15, the predetermined past period, that is, the viewing history retrieval range for calculating the next viewing channel likelihood, is set at five weeks, and a setting is made so that the next viewing channel likelihood is calculated based on the viewing history of the past five weeks from the present time zone.

Hence, it is assumed that the information on the viewing history of at least the past five weeks from the present point of time is acquired from video recognition device 20 and is stored in storage unit 47 of video reception device 40.

FIG. 16 is a diagram showing an example of the next viewing channel likelihoods calculated by video recognition unit 66 of video reception device 40 in the first exemplary embodiment.

FIG. 16 shows an example of the respective calculation values of the "occupancy" calculated in step S111, the "second setting status" calculated in step S112, and the "next viewing channel likelihood" calculated in step S113 for the respective channels shown in FIG. 15, which are the first channel, the second channel, the third channel, the fourth channel and the fifth channel.

Video recognition unit 66 calculates the "occupancy", which is described in step S111, by the following expression. Note that this exemplary embodiment illustrates an example where the weighting factor $\epsilon$ is set at 5.

Occupancy=$\epsilon$×(second number of viewing times of likelihood calculation target channel+1)/(viewing history retrieval range+1)

The "second number of viewing times" refers to a numeric value, which indicates the number of times that the user has viewed the likelihood calculation target channel in the same time zone as the next viewing time zone on the same day of the week as a day of the week to which the next viewing time zone belongs, in the viewing history retrieval range (past five weeks in the example shown in FIG. 15). For example, in the example shown in FIG. 15, the "second number of viewing times" regarding the fifth channel is a sum total of the number of viewing times in the fifth channel in 20:00 to 24:00 on the respective Mondays of the fifth week to the ninth week, and is 3 since the viewing has been performed in the same time zones of the fifth week, the eighth week and the ninth week. Hence, for example, the "occupancy" of the fifth channel in the time zone A selected as the "next viewing time zone" is as follows.

Occupancy=5×(3+1)/(5+1)=5×4/6=3.33

When such "occupancies" of the other channels are calculated in a similar way, as shown in FIG. 16, the "occupancies" are 0.83 in the first channel, 2.50 in the second channel, 0.83 in the third channel, and 0.83 in the fourth channel.

Next, video recognition unit 66 calculates the "second setting status", which is described in step S112, by the following expression. Note that this exemplary embodiment illustrates an example where the weighting factor is set at 3.

Second setting status=ζ×presence of recording setting (or viewing setting) in next viewing time zone Note that, in this expression, 1 is assigned if there is a setting, and 0 is assigned if there is no setting. In the example shown in FIG. 16, any channel of the first channel to the fifth channel is not set, and accordingly, as shown in FIG. 16, such "second setting statuses" of the respective channels are 0.

Next, video recognition unit 66 calculates the "next viewing channel likelihood", which is described in step S113, by the following expression.

Next viewing channel likelihood=occupancy+second setting status

For example, in the example shown in FIG. 15 and FIG. 16, the "next viewing channel likelihood" of the fifth channel is as follows.

Next viewing channel likelihood=3.33+0=3.33

When such "next viewing channel likelihoods" of the other channels are calculated in a similar way, as shown in FIG. 16, the "next viewing channel likelihoods" are 0.83 in the first channel, 2.50 in the second channel, 0.83 in the third channel, and 0.83 in the fourth channel.

Next, as described in step S115, video recognition unit 66 selects the channel in which the next viewing channel likelihood is the highest, as the "next viewing channel". In the example shown in FIG. 15 and FIG. 16, a numeric value of the "next viewing channel likelihood" of the fifth channel is the largest. Hence, video recognition unit 66 estimates that the fifth channel is the highest probable channel of the next viewing, and selects the fifth channel as the "next viewing channel".

Information on this next viewing channel is transmitted from video reception device 40 to video recognition device 20, and video recognition device 20 generates the local database based on the information on the next viewing channel, and transmits the generated local database to video reception device 40.

Note that the respective setting values mentioned herein are merely examples, and in this exemplary embodiment, the respective setting values are never limited to the above-mentioned numeric values. Desirably, the respective setting values are set optimally according to the specifications of additional information display system 10, and the like.

[1-3. Effect and Others]

As described above, in this exemplary embodiment, video reception device 40 is configured to be capable of performing the transmission/reception of the data through communication network 16, and includes input unit 65, video extraction unit 45, storage unit 47, video recognition unit 66, and control unit 41. Input unit 65 is configured to receive the video signal output from the video transmission device (for example, STB 14) installed on the outside. Video extraction unit 45 is configured to extract the partial video for the video recognition processing from the video signal. Storage unit 47 is configured to store the local database generated based on the information for generating the local database in video recognition device 20 connected to communication network 16. Video recognition unit 66 is configured to perform at least one of; the online matching processing for generating the second content recognition information (terminal video recognition information) from the partial video extracted by video extraction unit 45, transmitting the second content recognition information (terminal video recognition information) to video recognition device 20 so as to request video recognition device 20 to perform video recognition processing; and the local matching processing for collating the second content recognition information (terminal video recognition information) with the first content recognition information (server video recognition information) included in the local database stored in storage unit 47. Control unit 41 is configured to perform the control of acquiring the local database from video recognition device 20, and in addition, to perform the control of acquiring the additional information (for example, advertisement information), which is based on the result of the online matching processing or the result of the local matching processing, from additional information distribution device 30 connected to communication network 16.

The data amount of the online database stored in storage unit 23 of video recognition device 20 is enormous as mentioned above. Therefore, in the online matching processing, the content specifying processing with high accuracy can be performed; however, it takes a time to collate the second content recognition information (terminal video recognition information), which is transmitted from video reception device 40, and the first content recognition information (server video recognition information) stored as the online database in storage unit 23, with each other.

Meanwhile, the local database stored in storage unit 47 of video reception device 40 is generated by being selected from the online database by video recognition device 20, and accordingly, the data amount thereof is smaller in comparison with that of the online database. That is to say, the local matching processing to be performed by using the local database can be ended in a shorter time in comparison with the online matching processing.

Hence, video reception device 40 selectively performs the local matching processing and the online matching processing (or performs both of them), and thereby is capable of performing the content specifying processing (content specifying processing that is based on the video recognition processing) regarding the video signal, which is input from the video transmission device such as STB 14, with high accuracy while shortening the time.

Then, video reception device 40 can acquire the additional information, which is based on the result of the online matching processing or the local matching processing, from additional information distribution device 30, and can superimpose the additional information on the video signal.

Moreover, video reception device 40 may include displaying unit 54 configured to display the video in which additional information 51 is superimposed on the video signal.

Moreover, video recognition unit 66 of video reception device 40 may be configured to generate the next viewing information based on the viewing history stored in storage unit 47, and control unit 41 may be configured to perform the control of transmitting the next viewing information as the information for generating the local database to the video recognition device.

Moreover, video recognition unit 66 of video reception device 40 may be configured to estimate the time zone and the channel of the next viewing, and generate the next viewing information based on the viewing history stored in storage unit 47.

In this way, in video recognition device 20, the next viewing information can be used as the information for generating the local database, and accordingly, such a local database regarding the content in which a probability that the user may view the same is relatively high can be generated. Hence, video reception device 40 can perform the highly accurate local matching processing by using this local database.

Moreover, control unit 41 of video reception device 40 may be configured to receive the information on the viewing history, which information is generated and transmitted by video recognition device 20, and to store the received information in storage unit 47.

Other Exemplary Embodiment

As described above, the first exemplary embodiment has been described as exemplification of the technology disclosed in the present application. However, the technology in the present disclosure is not limited to this, and can also be applied to exemplary embodiments subjected to alteration, replacement, addition, omission and the like. Moreover, it is also possible to form new exemplary embodiments by combining with one another the respective constituents which are described in the foregoing first to third exemplary embodiments.

In this connection, another exemplary embodiment is exemplified below.

In the first exemplary embodiment, with reference to FIG. 6, the description is made of the example where video reception device 40 operates so as to perform either one of the local matching processing and the online matching processing. However, video reception device 40 may be configured to perform both of the local matching processing and the online matching processing as shown in FIG. 17 in place of the operations shown in FIG. 6 in the content specifying processing of step S41 shown in FIG. 5.

Figure 17:
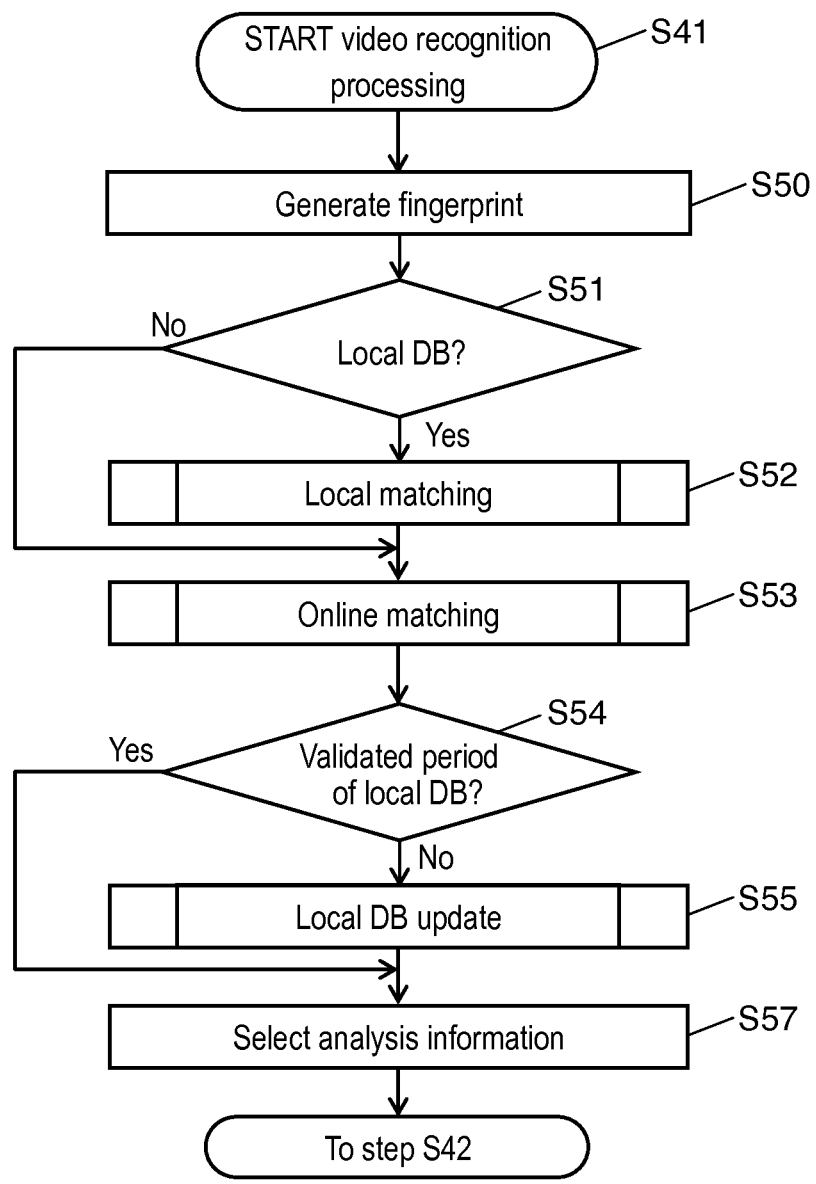
FIG. 17 is a flowchart schematically showing operations of content specifying processing performed by a video reception device in another exemplary embodiment.

FIG. 17 is a flowchart schematically showing operations of the content specifying processing performed by video reception device 40 in the other exemplary embodiment. Note that, in the flowchart shown in FIG. 17, the same reference numerals as the reference numerals shown in FIG. 6 are assigned to steps in which operations are substantially the same as those of the steps shown in FIG. 6, and a detailed description thereof is omitted.

In an operation example shown in FIG. 17, first, video recognition unit 66 generates a fingerprint (terminal video recognition information) from a partial video, which is extracted by video extraction unit 45, similarly to step S50 shown in FIG. 6 (step S50).

Next, control unit 41 determines whether or not a local database is stored in storage unit 47 similarly to step S51 shown in FIG. 6. Note that, in the following drawings, the local database is abbreviated as a "local DB" (step S51).

When it is determined in step S51 that the local database is stored in storage unit 47 (Yes), similarly to step S52 shown in FIG. 6, control unit 41 instructs video recognition unit 66 to perform the local matching processing, and video recognition unit 66 performs the local matching processing based on such an instruction (step S52).

When it is determined in step S51 that the local database is not stored in storage unit 47 (No), or after step S52 is ended, similarly to step S53 shown in FIG. 6, control unit 41 instructs video recognition unit 66 to perform the online matching processing, and video recognition unit 66 performs the online matching processing based on such an instruction (step S53).

Next, similarly to step S54 shown in FIG. 6, control unit 41 determines a validated period of the local database stored in storage unit 47 (step S54).

When it is determined in step S54 that the validated period of the local database has already elapsed, and that the local database cannot be used for the content specifying processing (No), similarly to step S55 shown in FIG. 6, control unit 41 controls the respective circuit blocks to update the local database (step S55).

When it is determined in step S54 that the local database is one within the validated period, and that the local database can be used for the content specifying processing (Yes), control unit 41 does not update the local database. Video recognition unit 66 selects either one of the result of the local matching processing and the result of the online matching processing (step S57), and shifts to step S42 of FIG. 5.

In step S57, when the result of the local matching processing and the result of the online matching processing coincide with each other, video recognition unit 66 may select a result of such coincidence, and when the results do not coincide with each other, video recognition unit 66 may select a result that the video recognition processing has failed. Alternatively, video recognition unit 66 may operate so as to select the result of the online matching processing when the result of the local matching processing and the result of the online matching processing do not coincide with each other.

In video reception device 40 configured as described above, both of the local matching processing and the online matching processing are performed, whereby the accuracy of the video recognition processing can be enhanced. Note that, in the flowchart shown in FIG. 17, the local matching processing may be performed after the online matching processing.

In the first exemplary embodiment, an example of the procedure of the local database update processing is shown in FIG. 9; however, in this exemplary embodiment, the local database update processing is never limited to the procedure shown in FIG. 9.

Figure 18:
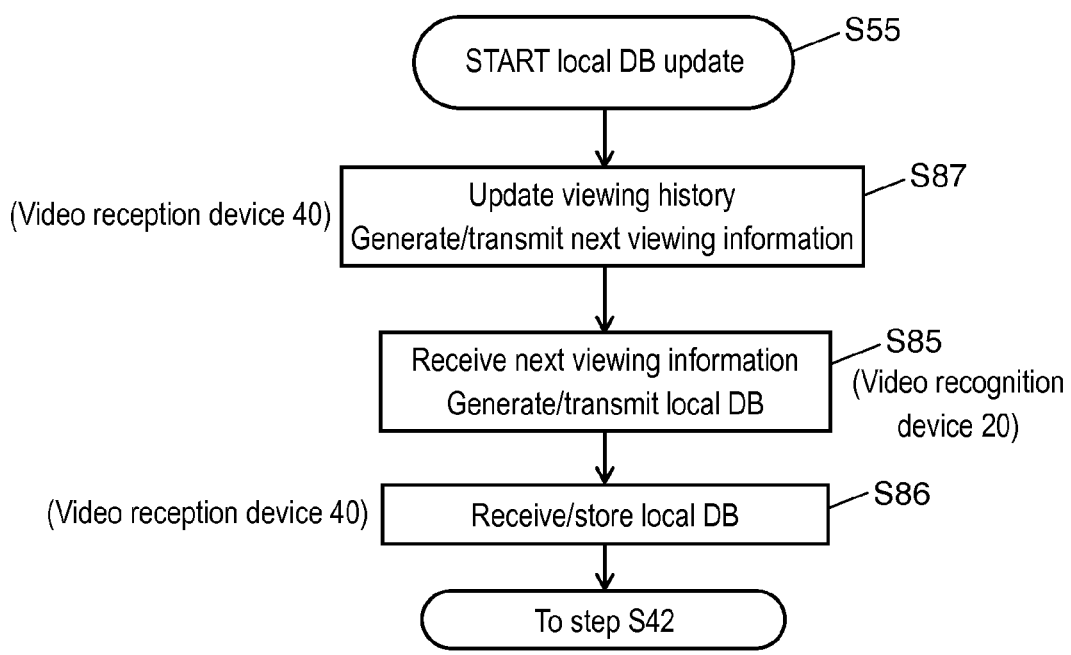
FIG. 18 is a flowchart schematically showing an example of the operations of local database update processing performed by the video reception device and a video recognition device in the other exemplary embodiment.

FIG. 18 is a flowchart schematically showing an example of the operations of local database update processing performed by video reception device 40 and video recognition device 20 in the other exemplary embodiment. Note that, in the flowchart shown in FIG. 18, the same reference numerals as the reference numerals shown in FIG. 9 are assigned to steps in which the operations are substantially the same as those of the steps shown in FIG. 9, and a detailed description thereof is omitted.

In the flowchart shown in FIG. 9, the example is shown, where the viewing history of video reception device 40 is managed by video recognition device 20, and meanwhile, in the flowchart shown in FIG. 18, the viewing history of video reception device 40 is managed by video reception device 40.

The present viewing information of video reception device 40 is added to the viewing history of video reception device 40, which is stored in storage unit 47, and the viewing history of video reception device 40 is updated. Similarly to step S83 shown in FIG. 9, video recognition unit 66 generates the next viewing information based on the information on the viewing history, which is stored in storage unit 47, and based on the present viewing information. Similarly to step S84 shown in FIG. 9, the generated next viewing information is transmitted from video reception device 40 to video recognition device 20 (step S87).

Similarly to step S85 shown in FIG. 9, video recognition device 20 generates the local database based on the next viewing information transmitted from video reception device 40, and transmits the generated local database to video reception device 40 (step S85).

Similarly to step S86 shown in FIG. 9, control unit 41 of video reception device 40 controls the respective circuit blocks to receive the local database, which is transmitted from video recognition device 20, and to store the received local database in storage unit 47 (step S86), and shifts to step S42 of FIG. 5.

In this way, the local database in storage unit 47 may be updated. In this technique, the local database is updated based on the viewing history stored in storage unit 47 of video reception device 40, and accordingly, the time required for the update of the local database can be shortened in comparison with the technique shown in FIG. 9.

Figure 19:
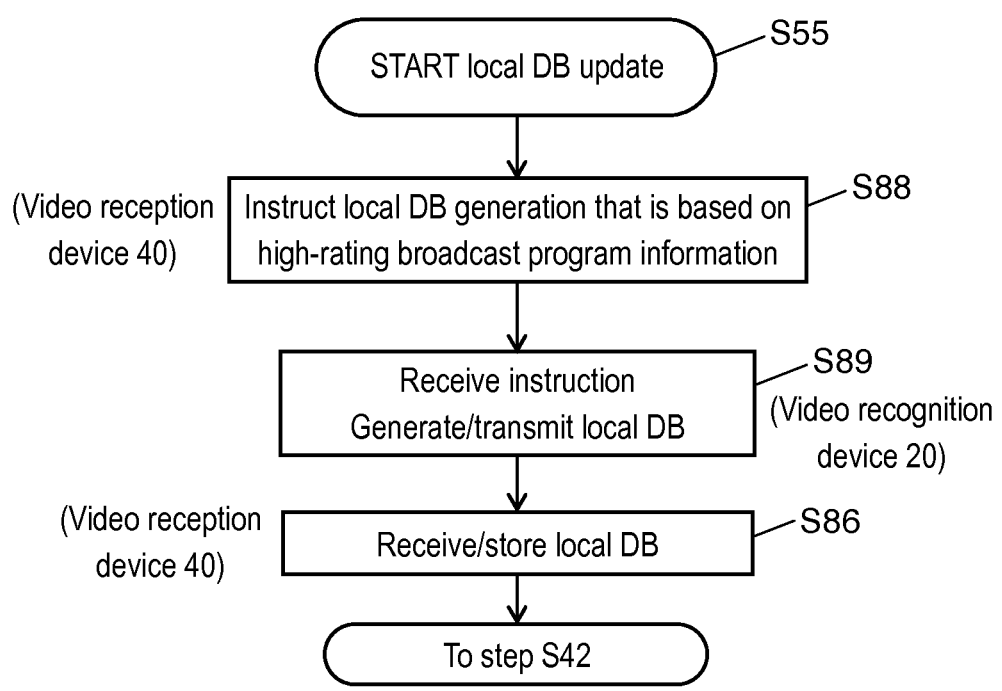
FIG. 19 is a flowchart schematically showing another example of the operations of the local database update processing performed by the video reception device and the video recognition device in the other exemplary embodiment.

FIG. 19 is a flowchart schematically showing another example of the operations of the local database update processing performed by video reception device 40 and video recognition device 20 in the other exemplary embodiment. Note that, in the flowchart shown in FIG. 19, the same reference numerals as the reference numerals shown in FIG. 9 are assigned to steps in which the operations are substantially the same as those of the steps shown in FIG. 9, and a detailed description thereof is omitted.

In the flowchart shown FIG. 18, the local database is updated based on high-rating broadcast program information.

Control unit 41 of video reception device 40 instructs video recognition device 20 to transmit the high-rating broadcast program information to video recognition device 20, and to generate the local database based on the high-rating broadcast program information (step S88).

For example, the high-rating broadcast program information refers to information indicating content that frequently serves as a target of the content specifying processing. Note that video reception device 40 may generate the high-rating broadcast program information by accumulating results of the content specifying processing in the past, or may acquire high-rating broadcast program information, which is supplied from the outside, through communication network 16. Alternatively, video reception device 40 may instruct video recognition device 20 to acquire the high-rating broadcast program information through communication network 16, and to generate the local database based on the high-rating broadcast program information.

As described above, control unit 41 of video reception device 40 may be configured to perform control of instructing video recognition device 20 to use the high-rating broadcast program information as the information for generating the local database.

Video recognition device 20 generates the local database based on the high-rating broadcast program information transmitted from video reception device 40, and transmits the generated local database to video reception device 40 (step S89). Note that the operation of video recognition device 20 in step S89 is substantially similar to that of step S85 shown in FIG. 9 except that the high-rating broadcast program information is substituted for the next viewing information.

Similarly to step S86 shown in FIG. 9, control unit 41 of video reception device 40 controls the respective circuit blocks to receive the local database, which is transmitted from video recognition device 20, and to store the received local database in storage unit 47 (step S86), and shifts to step S42 of FIG. 5.

As described above, the local database in storage unit 47 may be updated.

In this way, in video recognition device 20, such a local database regarding the content with a high rating can be generated. Hence, video reception device 40 can perform the highly accurate local matching processing by using this local database.

In the first exemplary embodiment, with regard to video reception device 40, the configuration including displaying unit 54 is described; however, the video reception device in this exemplary embodiment is never limited to this configuration. The video reception device does not have to include the displaying unit.

Figure 20:
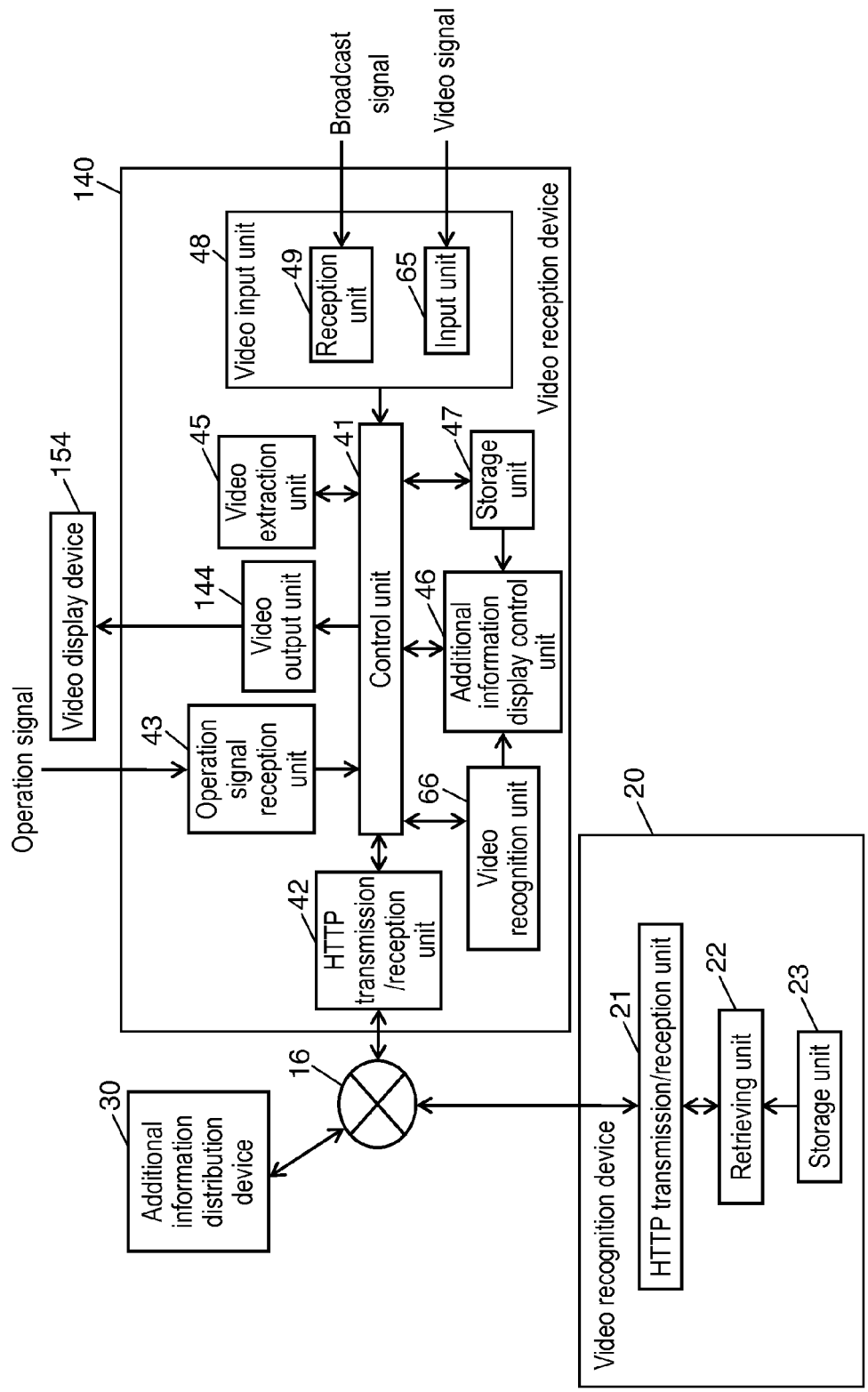
FIG. 20 is a block diagram schematically showing an example of configurations of the video recognition device and the video reception device in the other exemplary embodiment.

FIG. 20 is a block diagram schematically showing an example of a configuration of video reception device 140 in the other exemplary embodiment. Video reception device 140 shown in FIG. 20 is different from video reception device 40, which is shown in FIG. 3 in the first exemplary embodiment, mainly in the following points. Video reception device 140 does not include displaying unit 54, and is configured so that video output unit 144 can output a video signal in a wired manner or wirelessly to video display device 154 installed on the outside. Similarly to video output unit 44 shown in the first exemplary embodiment, video output unit 144 superimposes the additional information on the video signal based on the instruction from control unit 41.

As an example of video reception device 140 as described above, for example, there can be mentioned a recording device, which includes a recording function, a broadcast signal reception function, a video signal input function, and a video signal output function, and is configured to transmit the video signal to video display device 154 installed on the outside, and the like. For example, such a recording device includes a hard disk recorder, a DVD recorder, a BD recorder, and the like.

Note that, in FIG. 20, the same reference numerals are assigned to constituents which perform operations substantially equal to those of the constituents composing video reception device 40 shown in FIG. 3, and a description thereof is omitted. Moreover, in FIG. 20, main circuit blocks, which are related to the operations shown in this exemplary embodiment, are shown, and functions and circuit blocks (for example, recording function and the like) which are related to other operations are omitted.

Also in video reception device 140 having such a configuration, effects similar to those of video reception device 40 shown in the first exemplary embodiment can be obtained.

Note that the respective constituents shown in this exemplary embodiment may be individually composed of independent and dedicated circuits, or alternatively, may have a configuration in which a program created so as to realize one or plurality of operations is executed by a processor. Moreover, the program at this time may be acquired by being downloaded from a server and the like, or may be acquired through a predetermined recording medium (for example, an optical disk such as a CD-ROM, a magnetic disk, a semiconductor memory and the like).

Furthermore, the respective operations in the server shown in this exemplary embodiment may be subjected to centralized processing by a single server, or may be subjected to distributed processing by a plurality of servers.

Note that the specific numeric values shown in the first exemplary embodiment are merely those which illustrate an example of the exemplary embodiments, and the present disclosure is never limited to these numeric values. Desirably, the respective numeric values are set at optimum values in accordance with the specifications of the video reception device, and the like.

INDUSTRIAL APPLICABILITY

The present disclosure is applicable to the video reception device, which is capable of acquiring the additional information regarding the video signal input from the video transmission device installed on the outside, and superimposing the acquired additional information on the video signal. Specifically, the present disclosure is applicable to a television receiver, a hard disk recorder, a DVD recorder, a BD recorder, and the like.

REFERENCE MARKS IN THE DRAWINGS 10 additional information display system
12 broadcast station
14 STB
16 communication network
20 video recognition device
21,42 HTTP transmission/reception unit
22 retrieving unit
23,47 storage unit
30 additional information distribution device
40,140 video reception device
41,141 control unit
43 operation signal reception unit
44,144 video output unit
45 video extraction unit
46 additional information display control unit
48 video input unit
49 reception unit
51 additional information
54 displaying unit
65 input unit
66 video recognition unit
81 content
82,84 fingerprint
83 analysis information
91 video signal
154 video display device

The invention claimed is:
1. A video reception device for performing transmission/reception of data through a communication network, the video reception device comprising:
a reception circuit configured to receive a video signal;
a video extraction circuit configured to extract a partial video for video recognition processing from the video signal;
a memory configured to store a local database transmitted from a video recognition device connected to the video reception device via the communication network;
a video recognition circuit configured to generate second content recognition information from the partial video, transmit the second content recognition information to the video recognition device to request the video recognition device to perform online matching processing so as to collate the second content recognition information with first content recognition information and to acquire a result of the online matching processing, and perform local matching processing for collating the second content recognition information with the local database stored in the memory and to acquire a result of the local matching processing; and the video recognition circuit is further configured to generate next viewing information based on a viewing history stored in the memory, and a control circuit is configured to:
perform control of transmitting the next viewing information to the video recognition device,
acquire, from the video recognition device, the local database generated based on the next viewing information,
transmit the result of the online matching processing or the result of the local matching processing to an additional information distribution device connected to the communication network, and
perform control of acquiring additional information from the additional information distribution device connected to the communication network, the additional information being based on the result of the online matching processing or the result of the local matching processing, and the video recognition circuit is configured to estimate a time zone and a channel, in which viewing is implemented next, and generate the next viewing information based on the viewing history stored in the memory.

2. The video reception device according to claim 1, further comprising:
a display configured to display a video in which the additional information is superimposed on the video signal.

3. A video recognition method in a video reception device configured to be capable of performing transmission/reception of data through a communication network, the video recognition method comprising:
extracting a partial video for video recognition processing from a video signal input from an outside;
generating next viewing information based on a viewing history stored in a memory;
transmitting the next viewing information to a video recognition device connected to the video reception device via the communication network;
acquiring a local database generated based on the next viewing information by the video recognition device via the communication network, and storing the local database in the memory;
generating second content recognition information from the partial video;
transmitting the second content recognition information to the video recognition device;
requesting the video recognition device to perform online matching processing so as to collate the second content recognition information with first content recognition information and acquiring a result of the online matching processing;
performing local matching processing for collating the second content recognition information with the local database stored in the memory and acquiring a result of the local matching processing;
transmitting, to an additional information distribution device connected to the communication network, the result of the online matching processing or the result of the local matching processing; and
acquiring additional information from the additional information distribution device connected to the communication network, the additional information being based on the result of the online matching processing or the result of the local matching processing, and a time zone and a channel, in which viewing is implemented next, are estimated, and the next viewing information is generated based on the viewing history.

4. The video recognition method according to claim 3, further comprising:
displaying, on a display, a video in which the additional information is superimposed on the video signal.

5. An additional information display system including a video reception device, a video recognition device, and an additional information distribution device, the devices being configured to be capable of performing mutual transmission/reception of data through a communication network, wherein:
the video reception device includes:
a reception circuit configured to receive a video signal;
a video extraction circuit configured to extract a partial video for video recognition processing from the video signal;
a first memory configured to store a generated local database in the video recognition device;
a video recognition circuit configured to:
generate second content recognition information from the partial video,
transmit the second content recognition information to the video recognition device through the communication network,
request the video recognition device to perform online matching processing so as to collate the second content recognition information with first content recognition information and acquire a result of the online matching processing,
perform local matching processing for collating the second content recognition information with the local database stored in the first memory, and acquire a result of the local matching processing, and
generate next viewing information based on a viewing history stored in the first memory; and
a control circuit configured to:
perform control of transmitting the next viewing information to the video recognition device,
perform control of acquiring the local database generated based on the next viewing information from the video recognition device,
transmit, to the additional information distribution device through the communication network, the result of the online matching processing or the result of the local matching processing, and
perform control of acquiring additional information from the additional information distribution device through the communication network, the additional information being based on the result of the online matching processing or the result of the local matching processing,
the video recognition device includes:
a second memory configured to store the generated first content recognition information from the acquired video signal; and
a retrieving circuit configured to:
select the first content recognition information which is related to the information,
generate the local database and transmit the generated local database to the video reception device, and
perform the online matching processing so as to collate the second content recognition information, which is received through the communication network, with the stored first content recognition information, the additional information distribution device is configured to acquire the result of the online matching processing received through the communication network, or the result of the local matching processing and transmit additional information to the video reception device through the communication network, the additional information corresponding to the result of the online matching processing received through the communication network, or the result of the local matching processing and the video recognition circuit is configured to estimate a time zone and a channel, in which viewing is implemented next, and generate the next viewing information based on the viewing history stored in the memory.

* * * * *